United States Patent [19]

Ulman et al.

[11] 3,900,850
[45] Aug. 19, 1975

[54] DIGITAL PULSE TRAIN TRACKER

[75] Inventors: Lynn J. Ulman, Ellicott City; Raymond G. Green, Baltimore, both of Md.

[73] Assignee: Westinghouse Electric Corporation, Pittsburgh, Pa.

[22] Filed: Mar. 24, 1969

[21] Appl. No.: 809,778

[52] U.S. Cl. .............................. 343/7.3; 343/5 DP
[51] Int. Cl.² ........................................ G01S 9/14
[58] Field of Search ......................... 343/5 DP, 7.3

[56] References Cited
UNITED STATES PATENTS
3,354,455  11/1967  Briggs et al. ...................... 343/7.3

Primary Examiner—Malcolm F. Hubler
Attorney, Agent, or Firm—D. Schron

[57] ABSTRACT

A pulse train tracking system completely digital in operation is capable of tracking pulse trains in a dense signal environment. An acquisition circuit determines the existence of a unique pulse combination by measurement of the interpulse period between successive pulses within a preselected range of minimum and maximum interpulse periods. Acquired pulse trains are tracked by an available one of several tracking circuits, adapted to individually track different pulse trains of the same or different pulse repetition frequencies. The trackers predict the interpulse period, for a train being tracked and define a gate within which the predicted pulse should occur. The trackers correct the phasing of the gate relative to a received pulse within each period and correct the predicted inter-pulse period at a proportioned rate. Tracking is maintained in the absence of pulses for a preselected number of interpulse periods.

17 Claims, 28 Drawing Figures

INVENTORS
LYNN J. ULMAN
RAYMOND G. GREEN

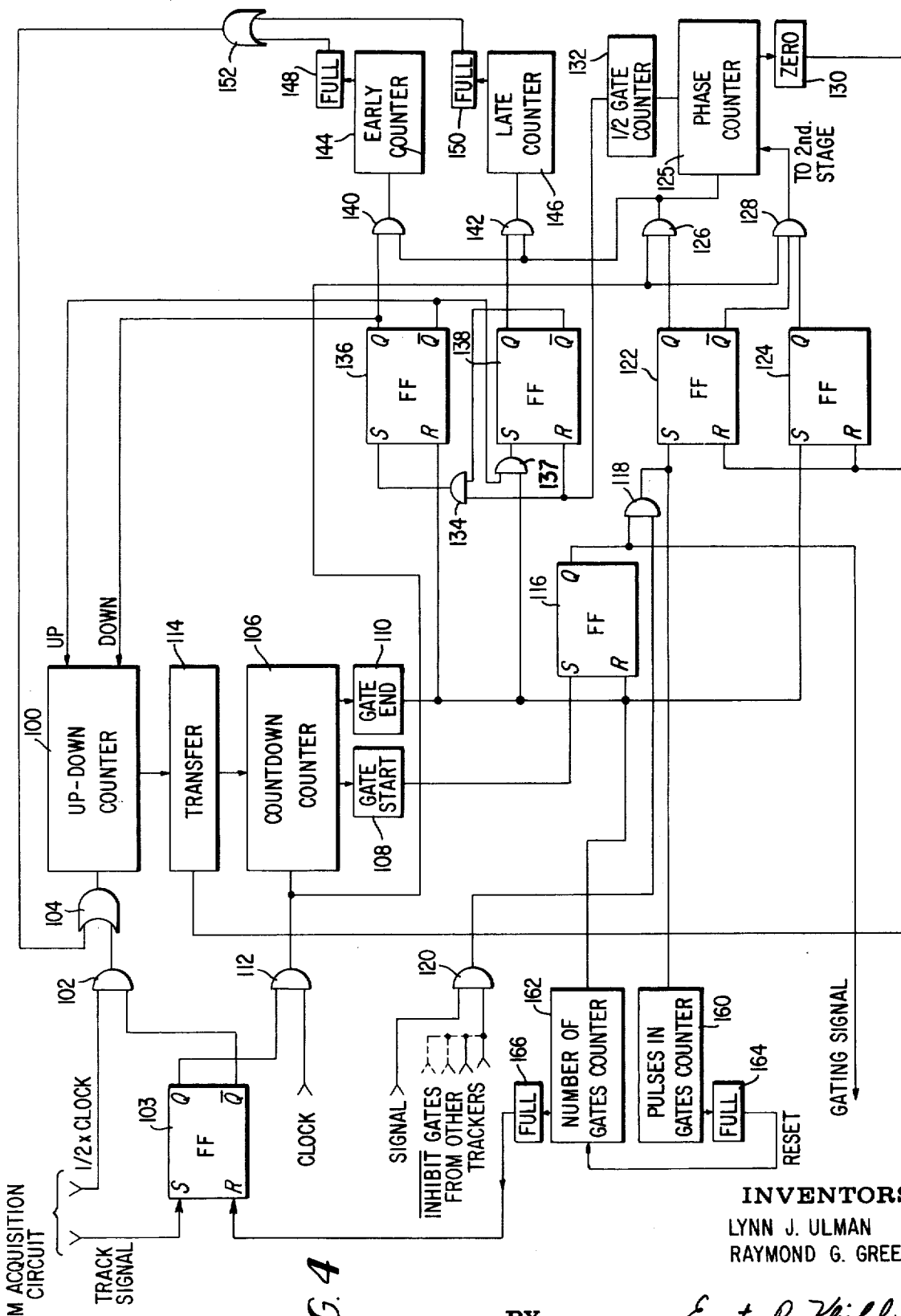

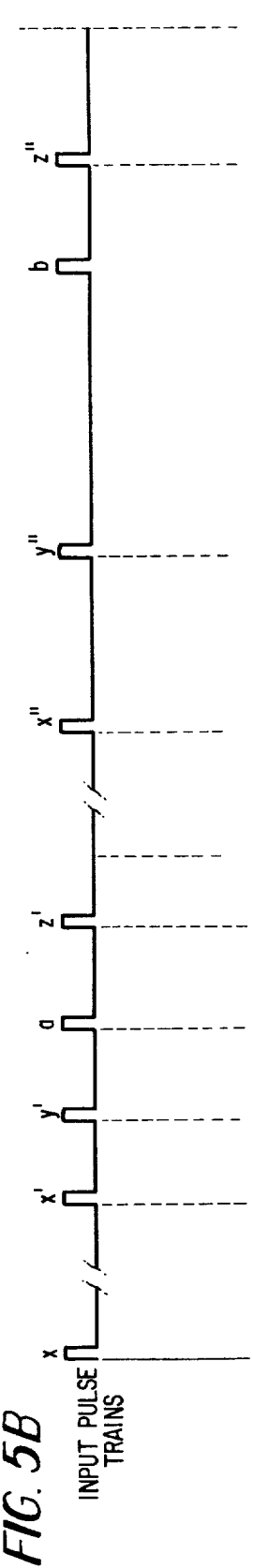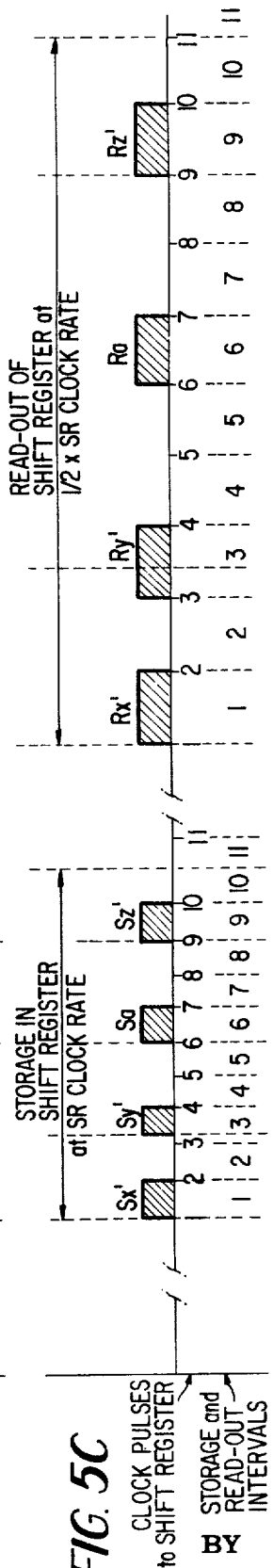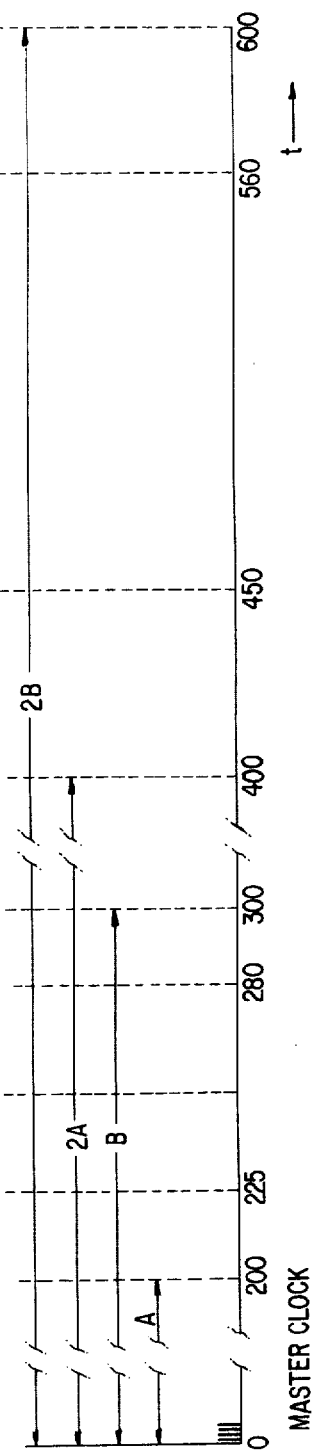
FIG. 5B INPUT PULSE TRAINS
FIG. 5C CLOCK PULSES to SHIFT REGISTER / STORAGE and READ-OUT INTERVALS
FIG. 5A MASTER CLOCK
INVENTORS
LYNN J. ULMAN
RAYMOND G. GREEN
BY Ernest P. Klipfel
ATTORNEY

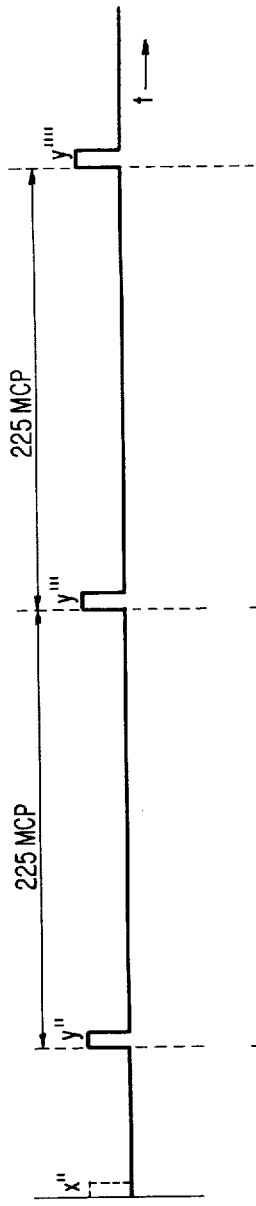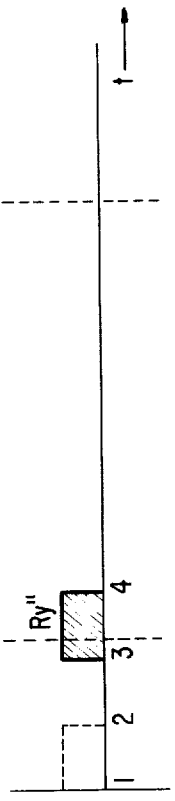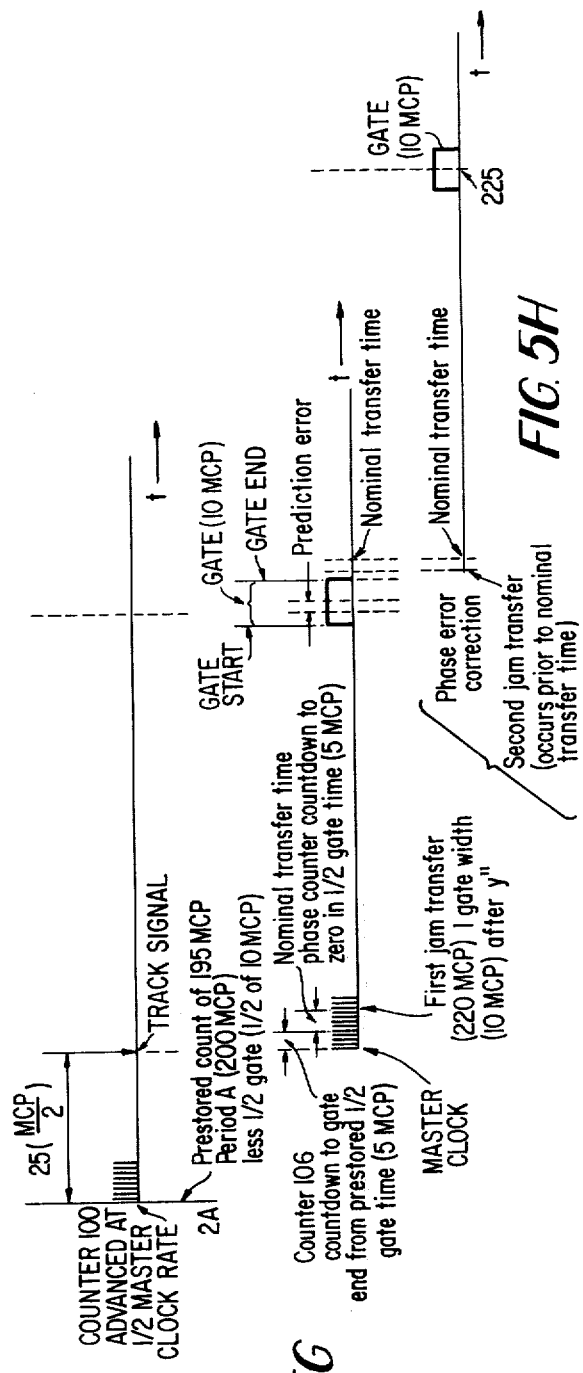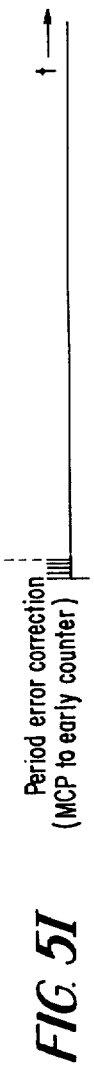

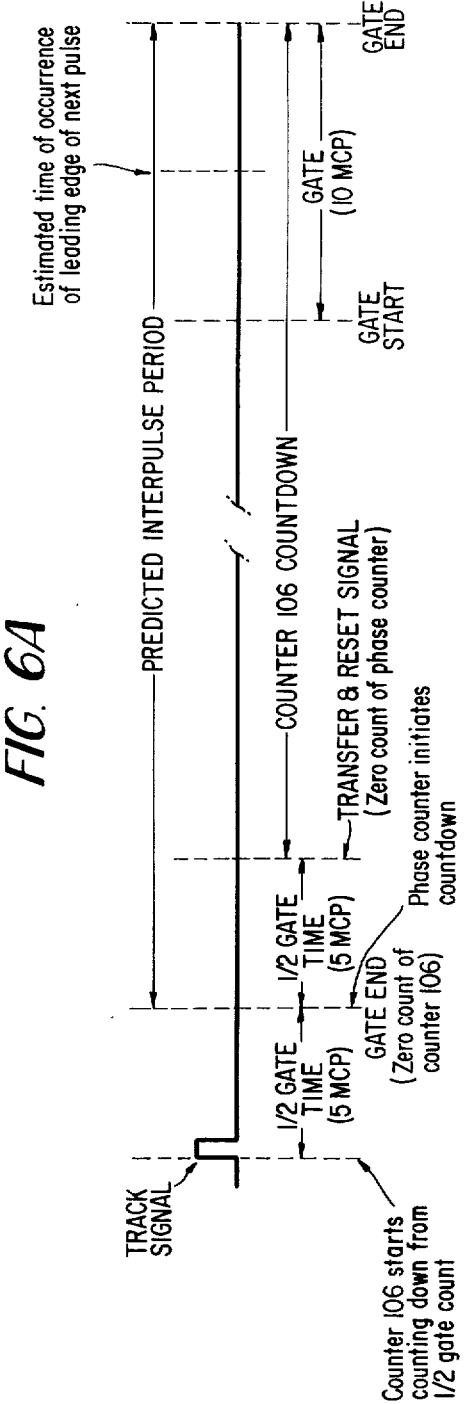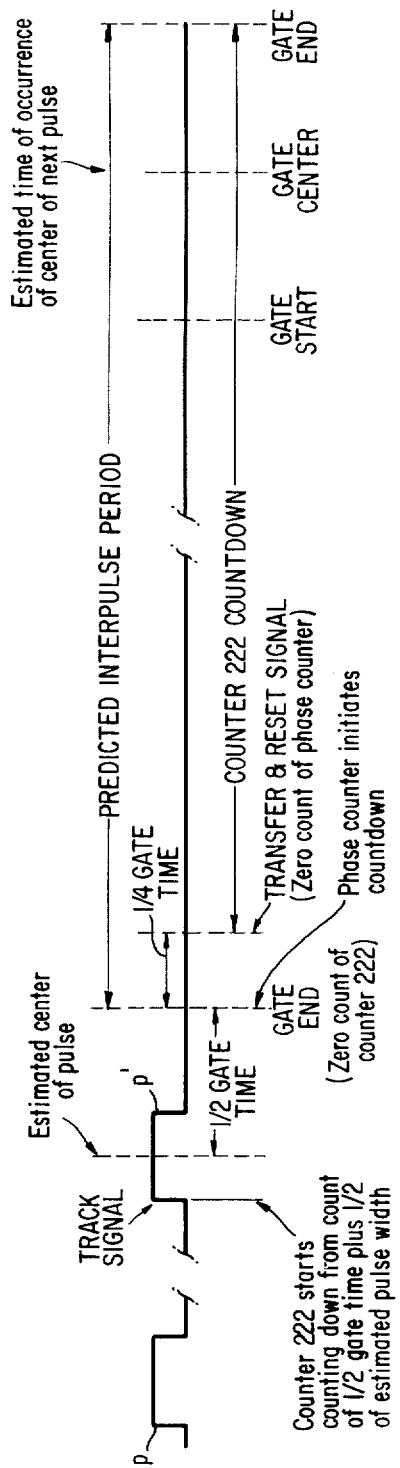

NO SIGNAL

SIGNAL AT GATE CENTER

SIGNAL IN EARLY GATE

SIGNAL IN LATE GATE

INVENTORS
LYNN J. ULMAN
RAYMOND G. GREEN

BY Ernest P. Klipfel
ATTORNEY

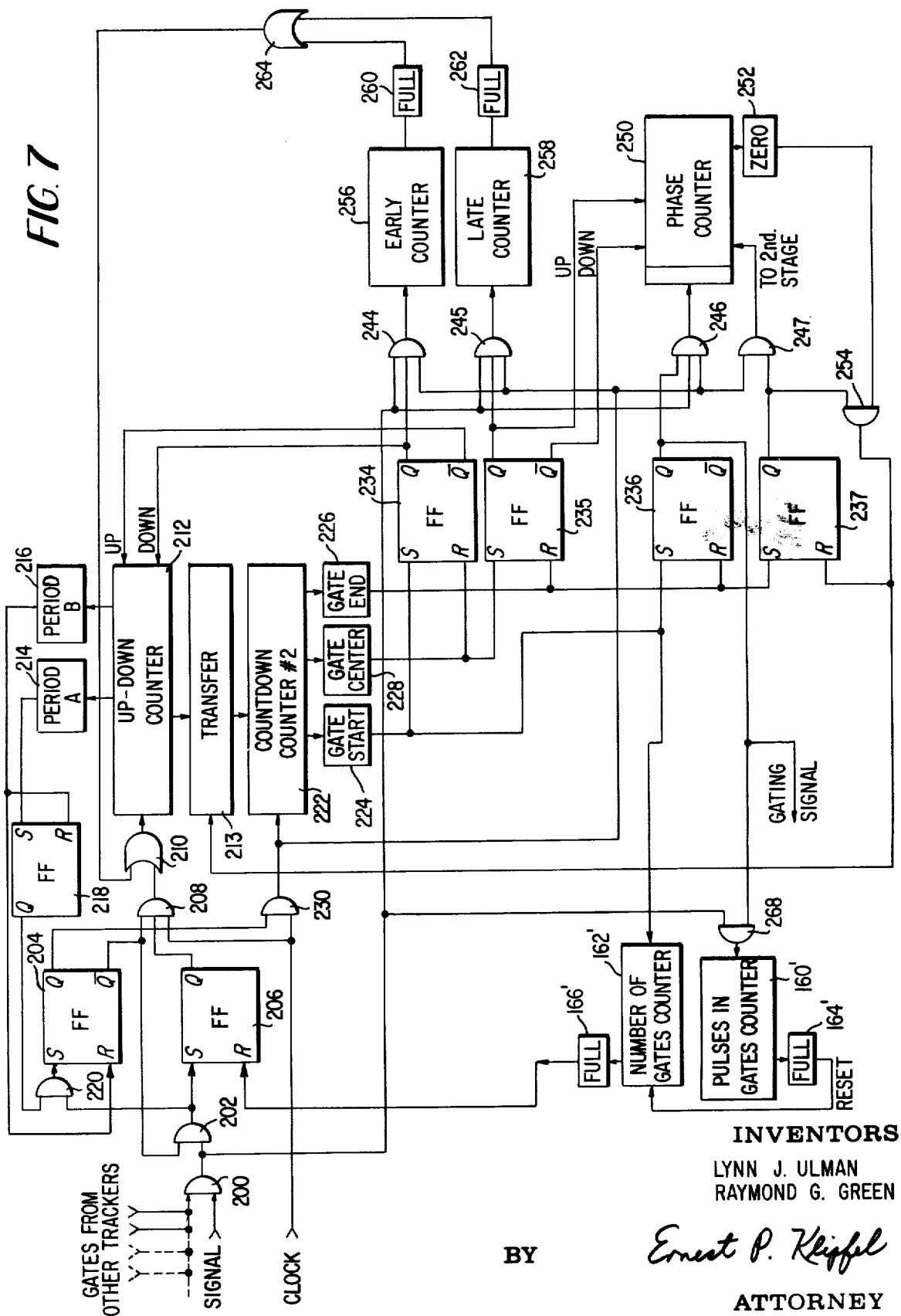

INVENTORS
LYNN J. ULMAN
RAYMOND G. GREEN

Ernst P. Klipfel
ATTORNEY

DIGITAL PULSE TRAIN TRACKER

BACKGROUND OF THE INVENTION

1. Field of the Invention:

This invention relates to a digital pulse train tracking system adapted to track simultaneously several different pulse trains, each having the same or different pulse repetition frequencies or inter-pulse periods, in a signal input of composite pulse trains of high pulse density. More particularly, the invention provides a pulse tracking system which is completely digital in operation and which is capable of simultaneously tracking a plurality of pulse trains occurring in a signal input of composite pulse trains and of high pulse density.

2. State of the Prior Art:

Pulse train tracking systems heretofore available in the prior art have depended wholly or in part on analog techniques for acquiring, or separating, a selected pulse train from an input composite signal of plural pulse trains. As is typical in such systems, a prediction is made of the occurrence of successive pulses of the train, based on a measurement of the inter-pulse interval within a train being tracked. The acquisition of a pulse train from the input signal typically is performed in a circuit similar to a phase locked loop. Such phase locked loop circuits in the past have employed, for example, voltage controlled oscillators and voltage controlled multivibrators. Analog circuits of this type and particularly those which operate to lock onto a pulse train rapidly, have poor long term stability and exhibit jitter when pulse trains having long inter-pulse intervals, or periods, are attempted to be tracked. More stable types of circuits, such as those employing voltage controlled crystal oscillators, exhibit improved long term stability but require a large number of pulse periods to achieve effective lock on.

In the prediction operation, there is typically established a gate within which the next successive pulse is expected to be found, and thus the expected time of arrival of that pulse. Since the prediction is subject to error, an error as to the timing of the pulse within that gate may occur. Correction of this error is very difficult with analog circuitry. For example, circuits using voltage controlled oscillator circuits typically correct the phase by changing the inter-pulse period, and thus the gate time, away from the correct value, measuring the resultant error, and then correcting the predicted inter-pulse period, and thus the timing of the gate, over a large number of successive inter-pulse intervals. Such an operation requires more time for effecting lock-on, and results in reduced stability in operation.

SUMMARY OF THE INVENTION

The tracking system of the invention overcomes these and other defects of prior art pulse train tracking systems and, particularly, employs completely digital techniques and systems to achieve the acquisition and tracking of pulse trains. All operations are performed on a timing basis established by a highly stable constant frequency master clock source. The pulse repetition rate of the master clock pulses is fixed, and all digital circuits operate on either the master clock repetition rate or some submultiple thereof. Thus, all operations, including measuring, storing, and correcting of the predicted inter-pulse period of a train being tracked are performed at a rate quantized to that of the master clock repetition rate. Phase errors in the predicted occurrence of a pulse within a gate are corrected within a single inter-pulse interval, and errors in the predicted periods are corrected at a proportioned rate, based on digitally measured errors in the predicted periods. The system is also capable of tracking pulse trains in which a substantial number of pulses are missing, over a larger number of inter-pulse periods. Errors which can accumultate during extended periods of time in which pulses are missing from the pulse train are rapidly corrected upon subsequent receipt of a pulse. For example, the phase error correction is immediately effected upon receipt of a pulse within the gate after a series of missing pulses in a train being tracked. Conversely, after a predetermined interval, the system automatically is released and the tracker is made available for assignment to a new tracking operation.

In accordance with the invention, there is provided an acquisition circuit which operates to identify and acquire pulse trains having inter-pulse periods which fall within an interval of minimum and a maximum predetermined inter-pulse periods. The acquisition circuit includes a counter actuated by the master clock pulse and in which counting is initiated upon receipt of a given pulse, for measuring the inter-pulse interval between that pulse and the next occurring pulse within the pre-established minimum and maximum inter-pulse periods. Receipt of a pulse within that predetermined interval is necessary for establishing initial acquisition of a pulse train. In one embodiment of the invention, the acquisition circuit requires the receipt of three successive signals having two equal inter-pulse periods, each falling within an interval of predetermined minimum and maximum inter-pulse periods, for establishing tracking.

A single acquisition circuit is provided which is effective for locking onto a number of pulse trains, in sequence, and whereby a free or available one of a plurality of pulse train trackers is assigned to each pulse train thus acquired.

Each of the pulse train trackers receives from the acquisition circuit the measured inter-pulse period as the initial prediction of the inter-pulse period of the train to which the tracker is assigned. Each tracker establishes a gate in accordance with the predicted inter-pulse period, within which the next successive pulse is expected to occur. Errors in the time position of the gate, relative to the next received pulse are subject to immediate correction by a phase correction circuit. The phase correction circuit operates at a rate quantized to the master clock rate to measure the error and to make the appropriate, immediate correction in the gate position for the predicted inter-pulse period. Period errors are accumulated at a rate quantized to the master clock rate, over several inter-pulse periods to establish a correction of the period prediction.

The trackers are capable of maintaining tracking even in the absence of pulses in a train being tracked, for substantial numbers of periods. Immediate phase correction is effected upon the next occurring pulse received within the gate. If the number of pulses of a given train received over a predetermined number of periods falls below a preselected ratio, the tracker is released.

BRIEF DESCRIPTION OF THE DRAWINGS

FIG. 4 comprises a detailed block diagram of a tracker in accordance with the first embodiment of the invention;

FIGS. 5A–5I comprise timing chart and waveform diagrams corresponding to operation of the system of FIGS. 3 and 4;

FIG. 7 comprises a detailed block diagram of an acquisition circuit and tracker in accordance with a further embodiment of the invention; and FIGS. 8A–8I comprise timing charts and wave form diagrams in accordance with the operation of the system of FIG. 7.

DETAILED DESCRIPTION OF THE INVENTION

GENERAL SYSTEM DIAGRAM - FIG. 1

Figure 1:
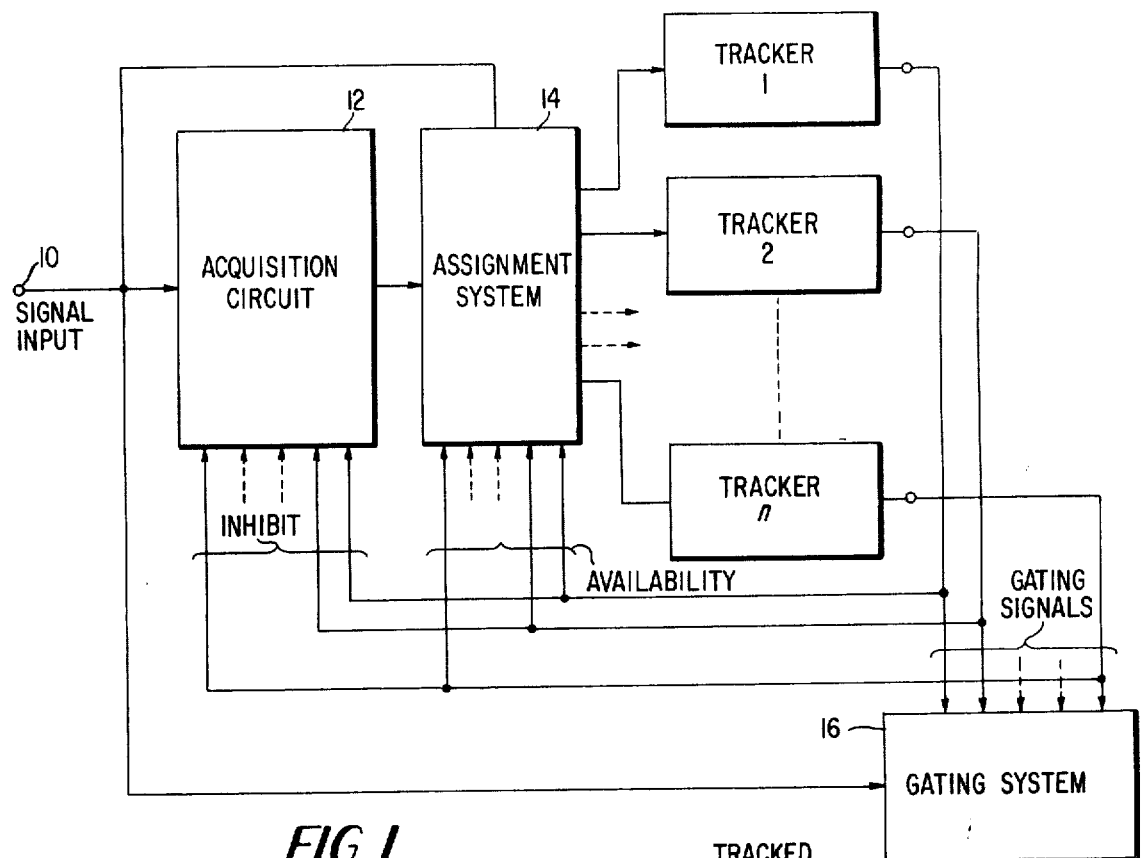
FIG. 1 shows a generalized block diagram of the system of the invention.

In FIG. 1, there is shown a general system diagram of a train tracking system in accordance with the invention. At the signal input 10 is received an input signal comprising a plurality of pulse trains of various different pulse repetition frequencies or rates, and thus of various different inter-pulse periods. The pulses may occur in a very dense stream and may be interspersed with noise, such as typical interference noise or that resultant from intentional jamming of the signal to prevent its reception by unauthorized sources. The signal input at terminal 10 is applied to an acquisition circuit 12 which is described in detail below. Acquisition circuit 12 operates to acquire individual pulse trains, in succession, from the signal at the input 10 for assignment to one of a plurality of trackers associated therewith. The acquisition circuit 12 particularly operates to select only pulse trains in which the inter-pulse period between successive pulses of a given train fall within certain minimum and maximum limits. In one embodiment of the invention, the acquisition circuit 12 imposes the further condition that three successive consecutive pulses of a train must exist at equal inter-pulse periods if that train is to be acquired and tracked.

An assignment system 14 is associated with the acquisition circuit 12 for assigning available ones of the plurality of trackers 1,2 ... and n to the acquisition circuit 12 during the acquisition of pulse trains. The assignment system 14 may provide any suitable order of priority in effecting the assignment of the trackers and may operate in any conventional manner for recognizing with trackers are free, or available, as distinguished from those which are busy, or occupied, in effecting the assignment in accordance with a desired priority.

The assignment system 14 also receives the input signal. Once a pulse train is acquired by acquisition circuit 12, and the necessary information for tracking has been conveyed to the assigned trackers, the assignment system directly supplies the entire input signal to that tracker. Each tracker then operates independently of the acquisition circuit to track that train to which it is assigned. The information so conveyed for establishing tracking comprises, for example, both the occurrence of a given pulse and the measurement of the inter-pulse period of the associated train being acquired. Each tracker thereafter operates to predict the occurrence of the next successive pulse of the train to which it is assigned, in accordance with a prediction system contained therein, and to correct that prediction where coincidence of the predicted occurrence and actual occurrence is not realized.

The outputs of the trackers 1, 2 ... n comprise gating signals which are of a desired width or duration, and which are produced in time in accordance with the predicted inter-pulse period to encompass the predicted occurrence of the next pulse of the train being tracked. These gating signals are supplied to a gating system 16 to which the signal from input 10 is also applied. The gating system 16 responds to the gating signal outputs of the trackers, individually, to provide selective gating of the pulses of the incoming signal to a corresponding plurality of outputs. At these outputs, therefore, there appear only the pulses of the trains tracked by the respectively associated ones of the trackers 1,2 ... n. Suitable utilization circuits 1,2 ... n receive the thus separated pulse trains. The utilization circuits may perform any desired operation in response to these separated pulse trains. For example, the modulation on the pulses may be detected or the pulses may be used for synchronization purposes or any other suitable purposes.

The gating signals from the trackers are also employed to provide information to the acquisition circuit 12 and the assignment system 14. Particularly, the acquisition circuit 12 must be controlled to only search for new pulse trains and not to perform a redundant or unnecessary search for a pulse train which has already been acquired. Depending on the speed of response to the system, the number of trackers provided and the density of the pulses in the input signal, and also the desired selectively of the system, the width of the gating signals may be selected to define a relatively narrow range within which a predicted pulse may occur.

The probability of more than one pulse in the input signal occurring within a given gating interval defined by the gating signals for more than a few such gating signals is highly unlikely. Thus, the gating signal is conveniently employed as an inhibit signal input to the acquisition circuit 12 to prevent the acquisition circuit 12 from attempting to acquire a pulse train which is currently being tracked. These gating signals also conveniently may be employed as availability indication signals to the assignment system 14 to enable the latter to identify and distinguish free, or available, trackers, from those which are currently engaged in tracking a train.

Each tracker is capable of maintaining tracking for a preselected number of inter-pulse intervals during which no signal pulses are received. After the predetermined number of intervals, the tracker is released and again becomes available to the assignment system 14 for further assignment.

Figure 2:
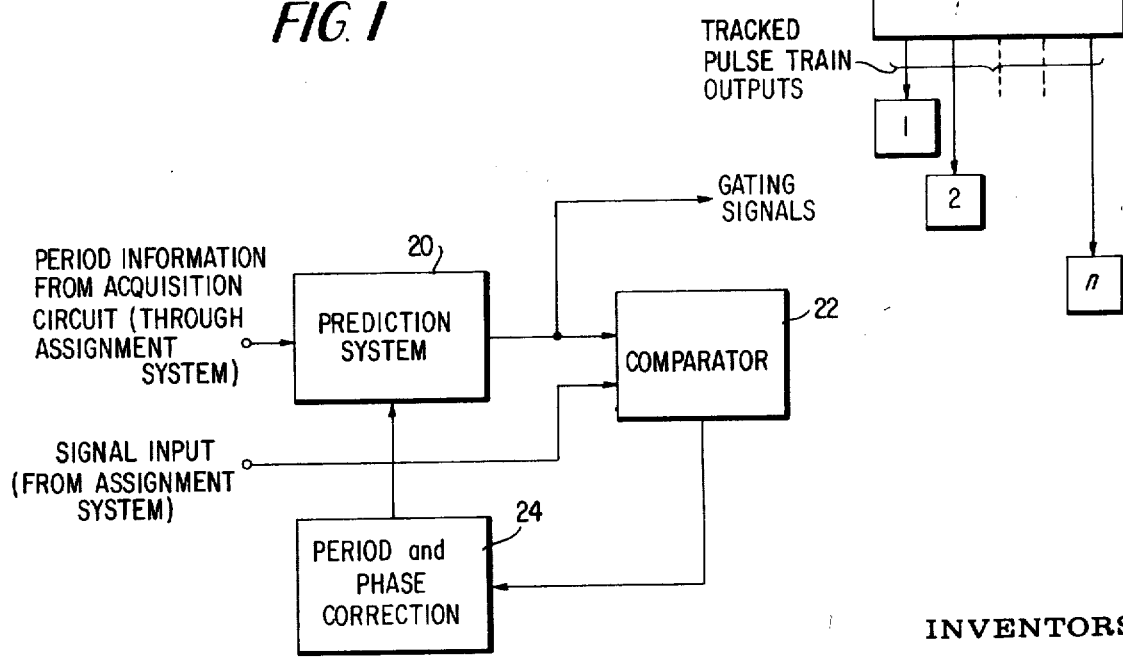
FIG. 2 shows a generalized block diagram of a tracker according to the invention.

In FIG. 2 is shown a generalized block diagram of one of the trackers 1,2 ... n of FIG. 1. Each of the trackers may be identical and, therefore, only one is shown in FIG. 2. Each tracker includes a prediction system 20, which, as noted, responds to information and controls from the acquisition circuit 12 to initially record or store the measured inter-pulse period of a pulse train during its acquisition. Conveniently, this information may be conveyed through the assignment system 14 from the acquisition circuit 12.

The prediction system 20 produces a gating signal identifying an interval or gate within which there is predicted the expected occurrence of a next successive pulse of the train being tracked. This gating signal is supplied to a comparator 22 to which is also supplied the signal input, again conveniently from the assignment system 14. The comparator 22 detects any error in the predicted occurrence of the pulse within the gating interval and produces an output which is related to any such error, which output is applied to a period and phase correction system 24. Errors in the prediction may be either or both of what are termed, and described in detail hereinafter, phase and period errors. The period and phase correction system 24 makes the appropriate corrections to the prediction system 20 to provide a desired relationship of the gate with the occurrence of the pulse.

Both period and phase errors are manifested by a displacement of the pulse as it actually occurs in time from the desired relationship within limits defined by the gate, and thus both essentially relate to an error in the predicted occurrence of the next pulse of a train. Both phase and period error corrections are based on a measurement of the difference, or error, between the predicted and actual occurrence of a pulse, as received. The phase correction is made effectively as a part of the prediction of the occurrence of the next pulse and operates to reposition the gate for the next pulse by an amount equal to the measured error. The period correction serves to change the predicted inter-pulse period by an amount related to the measured error. preferably, the period correction is formulated on a quantized basis and, therefore, corrects the predicted inter-pulse period over a plurality of such periods. The quantized period correction is particularly desirable when pulse trains being tracked may be accompanied by various forms of interference. This combination of period and phase corrections contributes to great stability in the operation of the system and particularly avoids jitter and other deleterious effects, such as overcorrection, which occur in systems that attempt to make major adjustments in the period prediction in response to any and all variations in the predicted pulse occurrence and the actual occurrence.

As will be apparent from the following detailed description of the invention, all systems are operated by timing, or clock pulses, derived from a master clock pulse source having a highly stable pulse repetition frequency, or rate. All functions, including measurement of inter-pulse periods, prediction of such periods, and measurement and correction of errors occurring in these predictions are performed in completely digital operations, the digital operating systems being exactly synchronized by reference to the master clock pulse rate. Thus, although various operations may be performed at rates other than the master clock pulse rate, conveniently such other rates are sub-multiples of the master clock pulse rate or are quantized to the master clock pulse rate. The accuracy of the system is, therefore, a function of the master clock pulse rate. An accuracy of measurement and prediction with the noted correction functions of plus or minus one clock pulse may be realized. Since the digital circuits employed are capable of extremely rapid operation, a desired degree of accuracy for the overall system may be attained by selecting a sufficiently high master clock pulse rate.

ACQUISITION CIRCUIT

Figure 3:
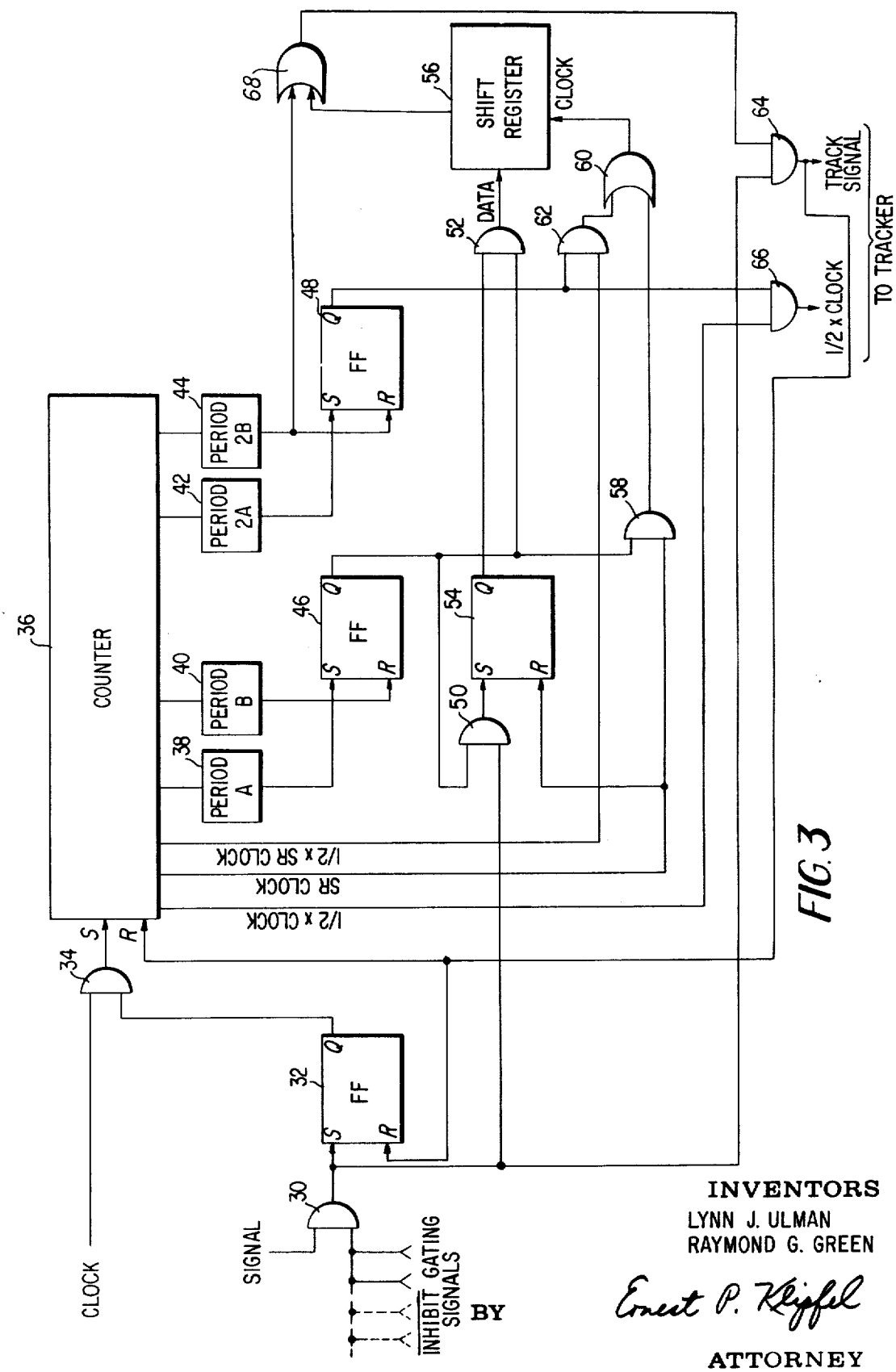
FIG. 3 comprises a detailed block diagram of an acquisition circuit in accordance with a first embodiment of the invention.

In FIG. 3 is shown a block diagram of a first embodiment of an acquisition circuit in accordance with the invention. All sub-component systems of the acquisition circuit may be of conventional type as described and therefore specific circuits illustrative of these systems have not been shown.

Input signals, including the pulse trains to be tracked, are applied to a first input of AND gate 30. $\overline{\text{INHIBIT}}$ gating signals are supplied in common for example through an OR gate (not shown), to a second input of AND gate 30. As discussed above, the acquisition circuit is controlled by the INHIBIT gating signals from the trackers to avoid a redundant or duplicative operation in which the acquisition circuit would attempt to acquire a pulse train currently being tracked by one of the trackers of the system already assigned to that pulse train. Thus, AND gate 30 is enabled to gate an input signal to its output only when the $\overline{\text{INHIBIT}}$ gating signals are present at all of the inputs to the second input terminal. Conversely, a false $\overline{\text{INHIBIT}}$ gating signal is supplied to AND gate 30, disabling it, for any signal already being tracked.

The output of AND gate 30 is connected to an input of a bi-stable device 32. Hereinafter, all such bi-stable devices, such as 32, are referred to as flip-flops, each having a set input terminal designated by the letter S and a reset input terminal designated by the letter R, and an output terminal designated by the letter Q from which an output is derived when the flip-flop is in its set state.

In all figures relating to the system block diagrams, the basic logic or operating functional blocks including AND gates and flip-flops are represented in a consistent manner, as are certain conventional OR gates, shift registers, counting circuits, and de-coding circuits therein employed. All of these basic elements may be of conventional construction and any suitable elements or systems providing the described operations may be employed in the alternative.

Operation of the acquisition circuit commences when a pulse is received from the signal train at the first input of AND gate 30 and all true $\overline{\text{INHIBIT}}$ gating signals are presented at the second input. This pulse is then applied to the set input terminal of flip-flop 32, switching it to its set state and producing an output at its Q output terminal which is applied to AND gate 34. Master clock pulses from a master clock source (not shown) are applied to a second input of AND gate 34 and, since the latter is now enabled, are passed to the input of counter 36.

Counter 36 may be of any desired type and, for example, may comprise a binary counter. Counter 36 has associated therewith decoder circuits 38, 40, 42, and 44. The decoder circuits respond to the appropriate stages of the counter 36 to respectively produce an output when a predetermined number of counts have been accumulated therein. Since the counting progresses at a master clock rate, these counts, therefore, represent predetermined time periods.

The acquisition circuit operates to acquire pulses of the input signals which define a train having inter-pulse periods within an interval of selected minimum and maximum periods. In particular, the acquisition circuit of FIG. 3 requires the derivation from the input signal of three such pulses having equal inter-pulse periods.

Thus, the interval from period A to period B represents the permissible range or interval of an inter-pulse period from a first to a second successive pulse, and the interval from period 2A to 2B, relative to that from period A to B, represents the same interval of inter-pulse periods between second and third successive pulses of a train which may be acquired.

The output of decoder 38 is applied to the set terminals of flip-flop 46, and the output of decoder 40 is applied to the reset input R of flip-flop 46. In similar manner the outputs of decoder 42 and 44 are applied to the set and reset inputs S and R, respectively, of flip-flop 48. The flip-flops 46 and 48, therefore, provide output signals at the set output terminals Q thereof during these intervals from period A to period B, and from period 2A to period 2B, respectively.

The Q output of flip-flop 46, when set, supplies an enabling input to AND gate 50 and to AND gate 52. Input signals from AND gate 30 are applied to AND gate 50 which, when enabled from the interval from period A to period B, applies the input signals to the set input of flip-flop 54. For a purpose to become apparent, there is applied to the reset terminal of flip-flop 54 a clock pulse train identified as the shift register (SR) clock which conveniently may be selected from an output of counter 36 and thus be maintained in a desired synchronized and timed relationship with the operation of counter 36. Flip-flop 46 is, therefore, reset at the SR clock rate and set at the occurrence of each input signal during the interval from period A to period B. There results at the output Q of flip-flop 54 a train of pulses corresponding to the input signal train during period A to period B, which train of pulses represents input data and is applied to the AND gate 52. Since AND gate 52 is also enabled during this interval, this data is applied to shift register 56.

Each input pulse serves to set a first stage of the shift register 56 and this set, or registered information, is advanced through the stages of shift register 56 at a clock rate which, during this input storage operation, comprises the shift register SR clock rate. This advancing is effected through the following circuit. AND gate 58 is enabled by the output of flip-flop 46 during the interval from period A to perioid B to pass the SR clock pulses to an input of OR gate 60. OR gate 60 operates to gate SR clock pulses to a shift input of the shift register 56.

Shift register 56 operates in a conventional manner in response to the SR clock input to advance the data through the successive stages thereof. The number of stages in the shift register is selected in accordance with the desired capacity of the system and in accordance with the desired accuracy, or resolution, in distinguishing the pulses received with these specified intervals of inter-pulse periods.

The acquisition circuit recognizes the successful acquisition, or receipt, of a third consecutive pulse of the described three pulse group during the interval from period 2A to period 2B, by comparison of the input signal received during this interval with the information stored in the shift register 56 and read out during the interval from period 2A to period 2B for effecting that comparison. Thus, at the termination of period B, flip-flop 46 is reset by the output of period B decoder 40, disabling AND gate 52, and further storage data in shift register 56 terminated. At the initiation of period 2A, flip-flop 48 produces an enabling output for enabling AND gate 62. For a reason which will become apparent, a clock pulse rate identified as ½ × SR clock is supplied to the AND gate 62 which, when enabled, passes the ½ × SR clock through OR gate 60 to the shift register 56 to advance the information stored therein at the ½ × SR clock rate to its output terminal.

The input signals from the output of AND gate 30 and the output of the OR gate 68 are applied to corresponding inputs of AND gate 64 which operates as a comparison circuit to identify the occurrence of an input signal in time coincidence with the read out from shift register 56 of stored data corresponding to the next preceding pulse of that train of equal inter-pulse intervals, or the reset output from the decoder 44. The successful comparison results in the production at the output terminal of AND gate 64 of a signal having two functions, track signal and reset. During this same interval from periods 2A to 2B, flip-flop 48 enables AND gate 66 which receives a clock pulse train identified as ½ clock from counter 36 and produces this clock pulse train at its output. The track signal and the ½ × clock signal are supplied to the tracker which has been assigned to effect the tracking of the train thus acquired by the acquisition circuit.

The reset output of AND gate 64 comprises a major system reset for the acquisition circuit and, for example, is applied to the reset input R of flip-flop 32, and to the counter 36 to reset the latter to a 0 count. Since an input pulse train, when successfully acquired, is immediately tracked by an assigned tracker, the acquisition circuit is thus immediately enabled to initiate searching operations for acquiring a further pulse train from the input signals. A further reset output is derived from the decoder 44 at the termination of period 2B applied to OR gate 68 which serves this same general system reset function if no successful comparison operation results and thus no train is acquired.

The time relationship of the operation of the various subcomponents of the acquisition circuit and its overall comparison function for acquiring pulse trains may be better understood with reference to the timing chart diagrams of FIGS. 5A, 5B and 5C. In FIG. 5A, the relationship of the master clock pulses (MCP) and the periods defined by the decoders 38, 40 and 42 and 44 associated with counter 36 are indicated. As noted, counting is initiated upon receipt of an input signal pulse, as represented by the pulse $x$ in FIG. 5B. As indicated in common time relationship, in FIG. 5A, master clock pulses are then supplied to the counter 36 which simultaneously initiates counting at the master clock rate. The period A has arbitrarily been defined to comprise a count of 200 MCP, period B, a count of 300 MCP, period 2A, a count of 400 MCP and period 2B, a count of 600 MCP. Within the interval from period A to period B, referenced in FIG. 5A, there are illustrated in FIG. 5B the occurrence of three pulses labeled $x'$, $y'$ and $z'$, occurring at counts of 200, 225 and 280 MCP, respectively. These pulses $x'$, $y'$, and $z'$ are intended to represent pulses of corresponding pulse trains $x$, $y$, and $z$. During the interval from period 2A to 2B, the pulse $x''$ is shown occurring at 400 MCP, thus comprising a third consecutive pulse of a train X in which the three consecutive pulses have equal inter-pulse periods of 200 MCP. In a similar manner, there are represented the pulses $y''$ and $z''$ at 450 and 560 MCP, respectively, similarly indicating the third consecutive pulses of pulse trains Y and Z, respectively, in which the three pulses have equal inter-pulse periods of 225 and 280 MCP, respectively. It will be apparent that for the pulses $y''$ and $z''$ to occur at the periods illustrated, the initial pulse of the three pulse group for each occurred in simultaneous time relationship with the input pulse $x$. The intervals of permissible inter-pulse periods indicated are merely for illustrative purposes and any desired intervals and corresponding count arrangements for digital measurement may be employed. Typically, these systems operate at rates in excess of one megacycle. Master clock rates and the MCP counts of the illustrative pulses would be greatly in excess of those indicated.

Other pulses of other trains or spurious noise signals may occur within the intervals defined by the periods A to B and 2A to 2B. For example in FIG. 5B there are shown pulses $a$ and $b$.

As discussed in relation to FIG. 3, the shift register 56 is advanced during the data storage operation from period A to period B at a rate in accordance with the SR clock and is read out during the interval from periods 2A to 2B at a rate in accordance with $\frac{1}{2} \times$ SR clock. This SR clock rate is a submultiple of the master clock rate, starts with the first master clock pulse gated to counter 36 and is selected in accordance with the number of stages in the shift register 56 to divide the interval from period A to period B into a number of storage intervals equal to the number of shift register stages. Since the interval from periods 2A to 2B is twice as great as that interval from periods A to B, read out is performed at $\frac{1}{2} \times$ SR clock. For reasons which will become apparent, the shift register includes one stage in excess of the total number of stages desired. For illustrative purposes, the shift register is shown to include stages numbered 1 through 11, providing 10 storage stages and a read-out stage.

The data loading or storage operation described in relation to FIG. 3 will be appreciated more readily with reference to the timing charts of FIGS. 5B and 5C. For convenience, the timing relationships will be expressed in relation to the counts of the master clock in FIG. 5A and the stages of the shift register will be described in relation to the numbers adjacent to the timing chart of FIG. 5C. The SR clock pulses operate in a conventional manner to advance the information through successive stages of the shift register. Signal pulse $x'$, arbitrarily selected to occur in time coincidence with the minimum inter-pulse period A results in the storage of pulse $S_x'$ in the first stage of the shift register 56. The shift register is reset such that all stages are in the 0 state initially. The first SR pulse does not result in a change in the state of any SR stages, as no signals were gated to the input of the shift register 56 at that time. The first pulse received, $x'$, is then stored in the first stage, since it occurs in the first storage interval, and may conventionally be considered as the storage of a 1 in that first stage as represented by $S_x'$. The second SR clock pulse advances $S_x'$ to the second stage and, since no input pulse is present during the second interval between SR clock pulses 2 and 3, a 0 remains in the first stage. Following SR clock 3, the pulse $y'$ is supplied to the shift register and is stored, as represented by the storage pulse $S_y'$. Upon the occurrence of SR4, $S_x'$ is advanced to the fourth stage, the third stage is reset to 0, the second stage stores the pulse $S_y'$ and the first stage, since no input pulse is present, remains at 0. In a similar manner, the pulses $a$ and $z'$ are subsequently stored and all stored pulses are advanced at the SR clock rate. The SR clock pulse which follows the last storage interval may occur after time B and so would not cause a shift. If this pulse is coincident with period B it must be suppressed by conventional means. At the termination of the tenth storage interval coincident with period B, all information has been stored and the first stored pulse $S_x'$ is presented at the next to the last stage of the shift register 56. The final stage remains in the 0 state since the first data stored cannot be shifted to this stage.

The interval from period 2A to 2B commences at 400 MCP, at which time a first pulse of the $\frac{1}{2} \times$ SR clock advances the storage pulse $S_x'$ to the output, or final stage of the shift register 56. This pulse is identified in FIG. 5C as $R_x'$. In time coincidence with the output storage pulse $R_x'$, the third consecutive pulse $x''$ of the train including the preceding pulses $x'$ and $x$ occurs.

With reference to FIG. 3, the AND circuit 64 then produces an output signal representing the successful comparison result, labelled track signal and reset. With reference to FIGS. 5A through 5C, other possible conditions for successful comparison indications are shown by the time coincidence of the third pulses $y''$ and $z''$ with the read-out pulses $R_y'$ and $R_z'$ from the shift register. In the illustration, therefore, there are shown the additional trains $y$ and $z$ which, assuming the first pulses $y$ and $z$ thereof to have occurred as represented by pulse $x$, would have resulted in successful comparisons. The conditions represented by the trains $x$, $y$ and $z$ therefore represent three separate tracking operations such as performed in successive search operations of the acquisition circuit.

By contrast, the pulse $a$ with resultant storage pulse $S_a$ has no corresponding pulse in the interval from period 2A to 2B and thus no comparison results. The pulse $b$ received in the interval from period 2A to 2B does not coincide with a read-out pulse, and thus does not result in a comparison. It will be appreciated that if pulse b had coincided with the read-out pulse $R_a$, an erroneous successful comparison would have resulted and the generation of a track signal would have occurred. Should a tracker have then been assigned to track this nonexistent pulse train, it would, through its own operations, be shortly released from this tracking operation and become available for assignment to a correctly acquired pulse train.

Any desired number of stages may be provided in the shift register dependent upon system operating speeds, type of frequency divider used to obtain the SR clock, and additionally, in accordance with the resolution desired in the shift register storage and comparison operations. Particularly, it will be appreciated that the exact occasion of a signal pulse can be measured only to an accuracy of ± 1 master clock pulse, and the comparison operation, indicating that a pulse received is the third pulse of a three pulse group having two equal interpulse periods is accurate only to within ± 1 SR clock pulse. As will be discussed, the accuracy in tracking is a function strictly of the clock pulses, and particularly of ± 1 clock pulse. The SR clock is selected to be of as high a rate as is practical considering the economic factors of cost, size, weight and the like, since the number of SR stages required increases with increasing SR clock rate. Higher SR clock rates reduce the probability of assigning a tracker to a nonexistent pulse train. In the example illustrated, the SR clock pulses occur at 1/10 the master clock rate, but this relationship may be modified as desired. Where binary counters are used, the use of a ratio of master clock rate to SR clock rate which is a power of 2 is desirable.

TRACKER CIRCUIT - FIG. 4

In FIG. 4 is shown a generalized system block diagram of a tracker in accordance with one embodiment of the invention, suitable for use with the acquisition circuit of FIG. 3. The tracker in accordance with this embodiment receives a measurement of the interpulse period of the pulse train to which it is assigned, from the acquisition circuit, during the second inter-pulse period and thus between the second and third of that train. The tracker then predicts the inter-pulse period based on this measurement and establishes a gate of desired width encompassing a time interval within which the thus predicted next successive pulse of that train should be received. The accuracy of the predicted inter-pulse period is measured as a function of the displacement of the leading edge of the pulse from the center of the gate, or gating interval. As described in relation to FIG. 1, an assignment system identifies a given tracker as being available for assignment and establishes appropriate connections between the acquisition circuit and that assigned tracker.

Referring now more specifically to FIG. 4 counter 100 is a conventional counter and preferably is a binary counter, which may be controlled by appropriate input control signals to count up or down, i.e., to accumulate counts or to subtract counts from those already accumulated. Counter 100 has stored therein initially a nominal counter of the period A, representing the minimum preselected inter-pulse period, less ½ the gate width. The gate width, is similarly defined by the occurrence of a preselected number of pulses and particularly master clock pulses, and thus a number of MCP periods. With reference to FIGS. 5a and 5c, the gate is illustrated to be of a width corresponding to 10MCP.

Referring concurrently to FIGS. 3 and 4, during the interval from period 2A to 2B, AND gate 66 is enabled to supply a pulse train at ½ × clock to the assigned tracker, which ½ × clock train is supplied to AND gate 102 in FIG. 4. Flip-flop 103 is normally in a first or reset state, producing an output at its reset output $\overline{Q}$ which is supplied to the AND gate 102 to enable AND gate 102 to gate the ½ x clock train through OR gate 104 to counter 100.

The purpose of this nominal initial storage in counter 100 is more apparent with reference to the timing charts of FIGS. 5D through 5F. In FIG. 5D are shown three consecutive pulses of the train Y and particularly pulses $y''$, $y'''$ and $y''''$ of the train of FIG. 5B, in addition to the pulse $x''$. It is assumed that the train X was not present and the pulse $x$ corresponded to a first pulse $y$ of train 9, and that the acquisition circuit is operating to acquire, and to effect the assignment of the tracker of FIG. 4 for tracking the pulse train Y. As shown in FIGS. 5A through 5D, the train Y has an inter-pulse period of 225 MCP. The pulse train at ½ × clock from AND gate 66 of the acquisition circuit of FIG. 3 is supplied to the AND gate 102 and through OR gate 104 to counter 100, causing the latter to accumulate a count at ½ × clock rate. This count accumulation is added to the prestored count of 195 MCP which corresponds to the nominal count of period A of 200 MCP less ½ the gate width, and thus less one-half of 10 MCP or 5 MCP. The successful comparison of the pulse $y''$ with the read-out shift register storage pulse $R_y'$ generates a track signal through the AND gate 64 of the acquisition circuit in FIG. 3, which is applied to the set terminal S of flip-flop 103 of the tracker of FIG. 4. The $\overline{Q}$ output from flip-flop 103 is then removed, and the AND gate 102 is disabled. The application of ½ × clock pulses to the counter 100 is thereby terminated and the final count ammumulation is the nominal count plus ½ of the difference of the MCP count at the time the signal $y''$ occurred and that at period 2A, or 450 MCP less 400 MCP equal to 25 MCP. As indicated, the inter-pulse period of the train Y is 225 MCP. The nominal prestored count in counter 100 (200 MCP) less ½ of the gate width, (5 MCP) plus the accumulated count (25 MCP) provides a total count of 220 MCP. The reason for the 5 MCP difference is explained hereafter.

Counter 106 similarly to counter 100, may comprise a conventional binary counter which is subject to having initially stored therein a count to be described, and which responds to input pulses to initially count down from the stored count before subsequent count accumulation. Prior to initiating a tracking operation, counter 106 is reset to a count of ½ the gate time. Counter 106 has associated therewith decoder circuits 108 and 110 which respectively define the start and the end of the gate interval, which interval is generally referred to as the gate.

Flip-flop 103, when set by the track signal, supplies the set output signal Q to AND gate 112, the latter also receiving clock pulses from the master clock pulse source (not shown) which are supplied to the counter 106. Since the counter 106 is initially set to the ½ gate width count, illustratively 5 MCP for a gate of 10 MCP, upon receipt of 5 master clock pulses, the gate end decoder 110 produces an output signal. In a manner to be described, this output signal from the gate end decoder 110 produces, through other systems responsive thereto, a transfer signal which is applied to the transfer system 114.

The transfer system 114 effects a so-called jam transfer of the binary count accumulated in counter 100 to the countdown counter 106. As long as flip-flop 103 remains in the set state, clock pulses are gated through the enabled AND gate 112 to the counter 106 for continuous countdown operation subsequent to each transfer. The number initially thus transferred is the measured inter-pulse period from the acquisition circuit, as accumulated in counter 100, less ½ the gate width. The total count of counter 100, therefore, is transferred to counter 106.

Thus, the system operates to establish in counter 106 the predicted inter-pulse period, less the nominal count of one-half the gate width. In a manner to be described, the transfer signal occurs at a time to establish the gate center at the predicted time of occurrence of the next successive pulse of the train being tracked.

As counter 106 counts down from this stored value, and as it approaches the end of the predicted inter-pulse period, the gate start decoder 108 is enabled and produces an output signal which is applied to the set terminal of flip-flop 116. A signal is thereupon produced at the set output terminals Q for enabling AND gate 118.

The input signal is applied to a first terminal of AND gate 120, the second input terminal of which receives INHIBIT gates from the gate signal outputs of other trackers which operate to inhibit the given tracker from receiving a signal if that signal is part of a train being tracked by another tracker. These gate signals may be obtained through the assignment system 14 in FIG. 1.

Assuming that no other tracker is tracking a signal received at this time, the AND gates 118 and 120 supply that signal to the set input terminals of flip-flop 122. At gate end time, the gate end decoder 110 supplies a set signal to flip-flop 124. The flip-flops 122 and 124 control the timing of counting operations performed by a phase counter 125 for correction of the error between the predicted and actual occurrence of a pulse of a train being tracked. This error, as noted, is a function of the displacement of the leading edge of that pulse from the center of the gate.

As described in more detail hereafter, the set, or Q outputs of the flip-flops 122 and 124 provide first enabling inputs to the AND gates 126 and 128, the reset output $\bar{Q}$ of flip-flop 122 further providing an enable input to the AND gate 128. Both of the AND gates 126 and 128 additionally receive clock pulses from the output of AND gate 112 and when enabled, respectively supply them to the normal input of phase counter 126 and to the input of the second stage of phase counter 125, respectively.

Phase counter 125 has prestored therein a count corresponding to the gate width, in this example, 10 MCP. Phase counter 125 counts down from this count to zero. The zero output decoder 130 produces a transfer and reset output signal for controlling the transfer system 114 and for resetting the flip-flops 122 and 124 by application of that signal to the reset inputs R of each thereof.

As described in more detail hereafter a ½ gate count decoder 132 produces an output signal when the phase counter 126 reaches the midpoint of its prestored count.

The output from the decoder 132 provides an enabling input to AND gate 134, the output of which is connected to the set input terminal S of flip-flop 136. The reset input terminal R of flip-flop 136 and the set input terminals of flip-flop 138 through AND gate 137, are connected to the output of the gate and decoder 110. The function of AND gate 137 is described in detail hereafter, but in general will be enabled to gate the gate and signal from decoder 110 whenever flip-flop 136 is reset. The flip-flop 138 is connected at its reset output terminal $\bar{Q}$ to the second input of AND gate 134. Flip-flops 136 and 138, when set, respectively provide outputs at their Q output terminals which are applied to associated AND gates 140 and 142, AND gates 140 and 142, when enabled, gate clock pulses received at their second input terminals to associated early and late counters 144 and 146.

The set output terminals Q of each of the flip-flops 136 and 138 are connected to a first input of corresponding AND gates 140 and 142, the second inputs of each thereof being connected to the output of AND gate 126. The outputs of AND gates 140 and 142 are respectively connected to the input of early and late counters 144 and 146. When the AND gates 140 and 142 are enabled by their respectively associated flip-flops 136 and 138, they serve to gate clock pulses from the output of the enabled AND gate 126 to the respectively associated early and late counters 144 and 146. Decoders 148 and 150 respectively associated with the early and late counters 144 and 146 supply an output pulse when the associated counter has accumulated a maximum count, these output pulses being connected through OR gate 152 and in turn through OR gate 104 to the input of counter 100.

The flip-flops 136 and 138 and the associated counters 144 and 146 serve to make corrections in the predicted interpulse period of a train being tracked by the tracker, but make this prediction only on a proportioned basis, or rate, determined by the independent accumulation of a predetermined number of clock pulses by the early and late counters 144 and 146. This operation is described in more detail hereafter. However, if the pulse occurs early in the gate, and thus prior to the midpoint of center of the gate, the flip-flop 136 which is in a set condition during the time clock pulses are gated to the early counter 144, provides an output signal from the set terminal Q which controls counter 100 to count down in accordance with an output from the full decoder 148 associated with the early counter 144. By contrast, flip-flop 136 is in the reset state during the time clock pulses are gated to the late counter 146 and thus produces an output at its reset output terminal $\bar{Q}$ which controls counter 100 to count up or to have the count added thereto, in accordance with an output from the full decoder 150 of the late counter 146.

Whereas the inter-pulse period is corrected on the described proportioned or quantized basis, a phase correction is effected for each inter-pulse period by timing of the transfer operation in the tracker. The phase correction is made by effecting an early or late transfer of a count from counter 100 to counter 106 in accordance with the output from the zero count decoder 130 associated with the phase counter 125.

The foregoing operations of the tracker are more readily appreciated by reference to FIGS. 5D through 5H. The waveforms are directly related to those of FIGS. 5A to 5C, and although drawn on a different time scale for clarity of illustration, are in exact timed relationship with the sequence of events illustrated in the waveforms of FIGS. 5A through 5C. Thus, with reference to FIGS. 5B through 5F, the successful comparision of pulse $y''$ and the read-out pulse $R_u'$ results in the generation of a track signal at the output of AND circuit 64 of the acquisition circuit in FIG. 3, which track signal is supplied to the set terminal S of flip-flop 103 in FIG. 4. As described above, counter 100 in FIG. 4 has prestored therein a count of the period A of the decoder 38 associated with counter 36 in FIG. 3 less a nominal count of one-half the gate width as defined by the counter 106 and the associated gate start and gate end decoders 108 and 110. At period 2A, ½ × clock pulses are supplied through AND gate 102 and OR gate 104 to counter 100 which, therefore, accumulates a count at ½ the rate of the master clock pulses. As shown, the inter-pulse interval of the train Y is 225 MCP. Between period 2A or 400 MCP, and the occurrence of the pulse $y''$, or 450 MCP, the counter 100 accumulates 25 counts, corresponding to 25 pulses at a rate MCP/2.

As described in detail below, the initial transfer function occurs a nominal time of one-half the gate (5 MCP) following the gate end signal. The gate end signal additionally followed the pulse $y''$ which produced the track signal by one-half the gate (5 MCP). As illustrated in FIG. 5G, counter 106 begins counting down at the master clock rate following the first jam transfer. At each transfer thereafter, counter 106 receives the jam transferred count from counter 100 which, as to these transfer functions, operates as a storage counter. The total count transferred to counter 106, and from which counter 106 initiates counting down operations, is the predicted inter-pulse period less one-half the gate width. In the illustration of the waveform diagrams, the actual inter-pulse period is 225 MCP. The transferred count zero from counter 100 was 220 MCP, and the transfer occurred 10 MCP following $y''$, or the track signal. The next successive pulse $y'''$ occurred, therefore, at the center of the gate, or 5 MCP prior to gate end at the zero count of counter 106.

For the conditions illustrated, exact tracking was initiated since transfer occurred at the exactly correct time following receipt of the pulse $y''$ and the predicted pulse occurred at the center of the gate, corresponding to an accurate prediction of an inter-pulse period of 225 MCP. For purposes of description, and for simplification of the illustration, however, let it be assumed that an error in the prediction occurred such that coincidence of the gate center with the leading edge of the pulse $y'''$ was not realized. In all cases, successful tracking is performed when the pulse does occur within the gate width, but an error is detected if the pulse occurs prior to the center of a gate, in what is termed hereafter the early gate, or following the center of the gate, in what is termed hereafter the late gate.

In a manner to be explained more fully, such an error in prediction is correctable both through phase error correction and through period error correction. The phase error correction is effected by causing the next jam transfer to occur at a time selected in relationship to the actual occurrence of the pulse relative to the gate start and gate end such that counter 106 initiates counting at a different point in time than it would have, had the idealized condition of exact centering of the gate with the pulse leading edge occurred. Such a phase correction in the transfer is assumed in FIG. 5H, and also assuming correct prediction of the inter-pulse period, the next received pulse $y''''$ will occur at the exact center of the gate, and assuming an inter-pulse period prediction correct to within one-half gate width, the next pulse will occur within the gate.

As illustrated in FIG. 5I, a period error correction is also initiated when such a prediction error occurs. The period error correction, however, is not made for each clock pulse which occurs within the interval of the prediction error, but only at a rate quantized to the master clock rate, and particularly at a rate based on an accumulation of a predetermined number of master clock pulses by the correspnding one of the early and late counters 144 and 146.

Figure 6B:
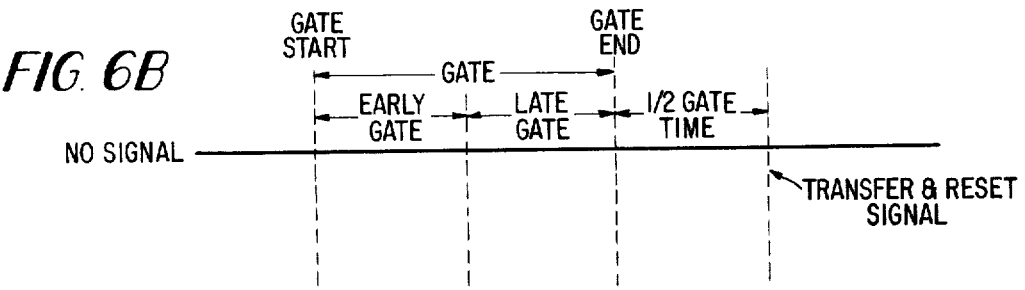
FIGS. 6A–6D comprise timing chart and wave form diagrams related to the operation of the tracker of FIG. 4.

The foregoing operations will be more readily understood with reference to the waveform diagrams of FIGS. 6A through 6E. With reference to FIG. 6A, as described above, upon the occurrence of the track signal, the counter 106 begins to count down to zero from a prestored count equal to ½ of the count of the gate width. Since flip-flop 116 was reset at a preceding time by the gate end decoder 110, it is not enabled at this time. As a result, flip-flop 122 is also not set. AND gate 126 therefore remains disabled. Flip-flop 124 is set when counter 106 counts to zero, by the output from gate end decoder 110 and the set output Q enables AND gate 128. The reset output Q from flip-flop 122 is also present for enabling AND gate 128, and thus clock pulses are passed from AND gate 112 through the enabled AND gate 128 to the second stage of phase counter 125. Phase counter 125 immediately initiates count at a double rate to produce the transfer signal ½ gate time following the gate end output. Phase counter 125 therefore counts down to zero in one-half the normal time, or one-half the gate width time, following the output from the gate end decoder 110. Therefore, the transfer and reset signal is produced one full gate time following the track signal. The count stored in counter 100 is thereupon transferred to counter 106, which immediately initiates count down.

The estimated inter-pulse period is therefore established as the time from the zero count of counter 106 of a preceding sequence, and the subsequent count down of the count transferred from counter 100 to counter 106 to a further zero count of counter 106. It is noted that the prestored count of counter 100 was a measured inter-pulse period less ½ the gate width, which corresponds to the nominal delay of the ½ gate width of the phase counter, following the zero count output, or gate end, of counter 106 and preceding the subsequent count down of counter 106. If no phase or period error in prediction exists, the pulse will be received at the midpoint of the gate, in accordance with the idealized conditions. The initial half gate time count of counter 106 provides for this idealized condition of centering of the gate at the leading edge of the next received pulse.

The waveform charts of FIGS. 6B through 6E illustrate the operation of the tracker in correcting for period and phase errors in prediction. A first possible condition shown in FIG. 6B, is one in which no signal is received within the gate. Although no error will be measured, such a condition is to be recognized and appropriate transfer functions are to be effected until a predetermined proportion or ratio of inter-pulse periods having missing pulses have elapsed at which time further circuitry, to be described, releases the tracker. If no signal is received, AND gate 120 is not enabled, and consequently AND gate 118 is not enabled to set flip-flop 122 during the gate. At the end of the gate, flip-flop 124 is enabled and clock pulses are supplied through AND gate 112 and AND gate 128 to the second stage of phase counter 125. Thus, at gate end, the phase counter initiates counting at a double rate to produce a zero output from decoder 130 for effecting transfer and reset operations one-half gate time (5 MCP) following gate end.

Figure 6C:
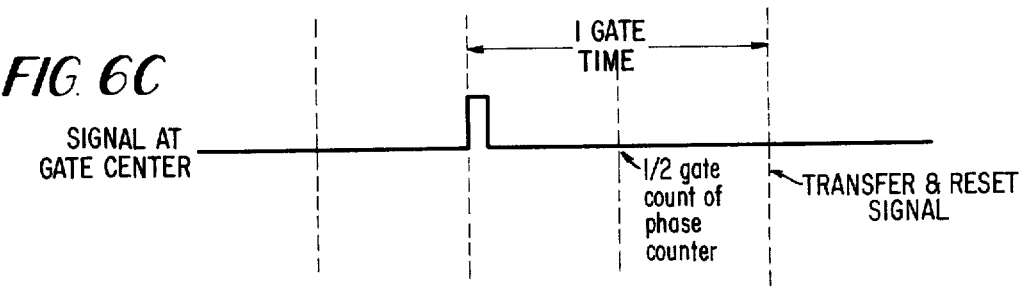

By contrast, for the idealized condition in which the leading edge of the pulse coincides with the center of the gate as shown in FIG. 6C, the signal is supplied through AND gate 120 and AND gate 118 to set flip-flop 122 and enable AND gate 126. Clock pulses are supplied at the input to the first stage of phase counter 125 and the phase counter 125 counts down to zero over a full gate interval to produce the transfer and reset signal at the nominal value of one-half gate time (5 MCP) after the gate end, as in the preceding situation in which no signal is received.

Figure 6D:
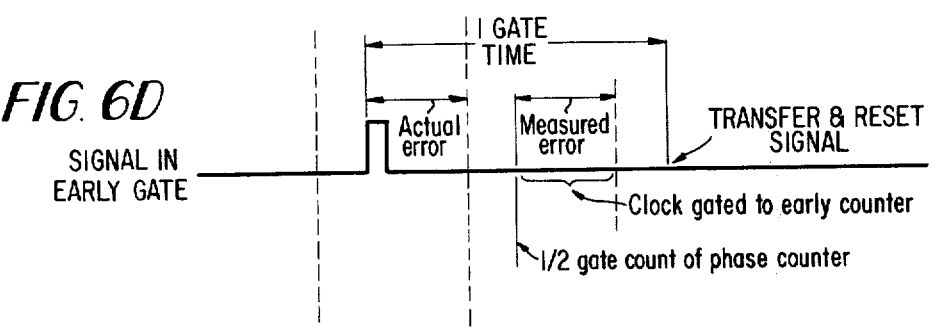

In FIG. 6D is illustrated the condition in which the pulse is received in the early gate, representing an actual error in prediction in accordance with the time displacement of the gate center and the pulse leading edge. As described previously, phase counter 125 begins counting at the master clock rate upon receipt of the pulse. The ½ gate decoder 132 supplies an enabling input to AND gate 134 which is enabled by the $\bar{Q}$ output from the reset flip-flop 138, which was reset by the output of gate end decoder 110 in a previous operation, to set flip-flop 136. The Q output of the flip-flop 136, when set, conditions counter 100 to count down and enables AND gate 140 to receive clock pulses from the output of AND gate 126 for accumulation in early counter 144.

The gate end decoder 110 resets flip-flop 136 and thus disables AND gate 140 from supplying further clock pulses to early counter 144. In FIG. 6D, the bracketed portion corresponds to this interval during which clock pulses are gated to the early counter 144 and corresponds in time to the actual error between the occurrence of the pulse and the predicted occurrence at the center of the gate.

Typically, several inter-pulse intervals having such prediction errors are required for early counter 144 to become full and produce an output from full decoder 148 which is supplied to counter 100 to cause it to count down, and thus in a direction to decrease the predicted interpulse period. After accumulation of a predetermined number of clock pulses, the early counter 144 produces at its decoder output 148 a period correction signal which is supplied to the counter 100 to cause it to count down and thereby establish a correction in the predicted inter-pulse period.

At the gate end, the decoder 110 produces a gate end output. Prior to reset of flip-flop 136, AND gate 137, which may be constructed to be responsive only to the leading edge of the gate end decoder 110 output, is disabled, and thus flip-flop 138 is not set.

Figure 6E:
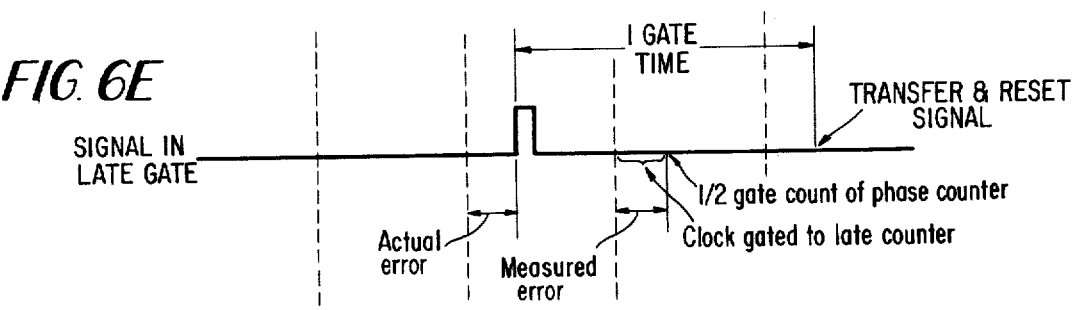

In FIG. 6E is shown the condition in which the pulse occurs in the late gate and in which the actual error in prediction is again, that between the gate center and the leading edge of the pulse. In this situation, phase counter 126 again begins counting from the occurrence of the signal for the full interval of the pre-stored gate time. Under these conditions, the output from gate end decoder 110 occurs prior to the output from the ½ gate count decoder 132 associated with phase counter 136. As a result, flip-flop 136 is reset and flip-flop 138 is set by the gate end output from decoder 110. The Q output of the set flip-flop 138 enables AND gate 142 and thus clock pulses from AND gate 126 are gated by AND gate 142 to the late counter 146. The $\bar{Q}$ output of the now reset flip-flop 136 conditions counter 100 to count up or to accumulate a count from the full output decoder 150 associated with late counter 146. The clock pulses are gated to late counter 146 for the interval from the occurrence of the gate end output of decoder 110 and the ½ gate count output of decoder 132, the latter resetting flip-flop 138 and thereby removing the enabling input to AND gate 142. Thus, the measurement of the error is between the gate end and the half gate count of the phase counter and is equal to the actual error, as indicated in FIG. 6E. When phase counter 126 counts down to zero, the zero decoder output 130 produces the transfer signal and a reset signal for the flip-flops 122 and 124.

The tracker of FIG. 4 provides for continuation of tracking for a desired number of inter-pulse intervals in which pulses are missing. If no pulse is received at the end of that interval, the tracker is released and available for further assignment. The discontinue or release function is a proportioned comparison of the number of pulses received over many periods to the number of gates, and thus the number of periods. Referring specifically to FIG. 4, the output of AND gate 118, representing receipt of a pulse within the gate, is supplied to a counter 160 for accumulating a count for each such pulse received. The output of gate end decoder 110 is also supplied to a counter 160 which accumulates a count for each gate end output and thus for each interpulse period. The counters 160 and 162 have associated therewith full decoders 164 and 166, respectively. The full decoder 164 associated with the pulse in gate counter 160 provides a reset signal to the counter 162. The full decoder 166 associated with counter 162 provides a reset signal output which is applied as a general reset signal to all operating systems of the tracker of FIG. 4, and which operates to discontinue further tracking and render the tracker available for a new assignment. In the operation of the discontinue circuit, it will be appreciated that the counters 160 and 162, and their associated decoders provide a proportioned count of pulses to interpulse periods which must be maintained if the tracker is to continue the tracking function.

COMBINED ACQUISITION AND TRACKING CIRCUIT OF FIG. 7

In FIG. 7 is shown a block diagram of an embodiment of the invention incorporating both acquisition and tracking operations in a single system. The embodiment of the invention in FIG. 7 incorporates many of the features of the acquisition and tracking circuits of the preceding embodiments of the invention, but in which certain sub-component systems perform dual functions related both to the acquisition and to the tracking operations. In contrast to the three pulse acquisition requirement of the acquisition system of FIG. 3, the acquisition function of the system of FIG. 7 is performed on the receipt of a second pulse which follows a first pulse within a range of minimum and maximum inter-pulse periods. The tracking operation is, in function, a substantial equivalent of that of FIG. 4. However, in this embodiment, the prediction error is measured as a function of the displacement of the center of the pulse of the train being tracked from the center of the gate.

Referring more specifically to the block diagram of FIG. 7, input signals are supplied to a first input of AND gate 200, the second input of which receives gating signals from other trackers to provide an inhibit function for the identical reasons as explained in relation to the signal input to the tracker of FIG. 4. In the absence of a gate from any other tracker of a system incorporating a plurality of trackers, and in which the tracker of FIG. 7 is employed, the AND gate 200 is enabled to provide a first enabling input to AND gate 202. Flip-flop 204, the function of which is explained hereinafter, is in a reset state at this time and, therefore, produces an output at its $\bar{Q}$ output terminal, providing an enabling input to the second input terminal of AND gate 202. AND gate 202 is thus enabled to pass the input signal to the set terminal S of flip-flop 206. Flip-flop 206, when thus enabled, provides an enabling input to the second input terminal of AND gate 208, the first terminal of which is then receiving an enabling input from the $\bar{Q}$ terminal of flip-flop 204. Clock pulses from a master clock source (not shown) are continuously supplied to the third input of AND gate 208, which, when thus enabled, passes the clock pulses through OR gate 210 to counter 212.

Counter 212 thereupon accumulates a count at the master clock rate to establish an initial measure of the inter-pulse period of a train to be acquired. Counter 212 is preset to a count equal to the maximum count of the counter less ¼ gate time. When clock pulses are gated to the counter it counts from this value to the maximum, then to zero and on to higher counts which correspond to the time interval which has passed less ¼ gate time. This compensates for the nominal ¼ gate time added by the phase counter as described later. Counter 212 is, therefore, controlled to count at the master clock rate until the receipt of a second pulse which falls within the interval of minimum and maximum inter-pulse periods of predetermined values. The minimum and maximum values are established by the period A and period B decoders 214 and 216 which operate in a manner identical to the periods A and B decoders of FIG. 3, except that the actual counts for these decoders are ¼ gate time less than the counts correspnding to Period A and Period B. The output from period A decoder 214 is applied to the set input terminal S of flip-flop 218, which, when set, produces an output at its set terminal Q which is applied to a first input of AND gate 220. Flip-flop 218 remains in the set state until counter 212 has counted through the interval of the permissible inter-pulse periods, at which point the period B decoder 216 supplies an output which is applied to the reset terminal R of flip-flop 218. Flip-flop 218 is thereupon reset, and no longer supplies an enabling input to AND gate 220.

Flip-flop 218, therefore, maintains an enabling input to AND gate 220 for the entire interval between the minimum and maximum permitted inter-pulse periods A to B. If a further signal is received at AND gate 220 during this interval, it is gated through AND gate 202 to AND gate 220, the latter supplying an input signal to the set terminal S of flip-flop 204. Flip-flop 204, when thus set, removes the output from the reset output terminal Q and produces an output at the set terminal Q. AND gate 208 is, therefore, disabled, and counter 212 ceases the count accumulation of master clock pulses. Counter 212, therefore, has accumulated a count of master clock pulses which define a measurement of the inter-pulse period. If counter 212 counts through period B, without the receipt of a signal in the permissible range of inter-pulse periods, decoder 216 produces a reset signal for clearing the counter 212 and resetting flip-flops 204 and 206, whereupon the acquisition portion of the system of FIG. 7 commences a further search for acquiring a pulse train.

In a manner described in more detail hereinafter, counter 222 has stored therein a count of ½ the gate time pulse ½ of the estimated pulse width. Similarly to the tracker of FIG. 4, the count down counter 222 has associated therewith a gate start decoder 224 and a gate end decoder 226 which, in association with the counting operation of the counter 222, defines the gate width or duration. There is further provided a center of gate decoder 228 which defines the mid-point in time of this gate.

AND gate 230 receives an enabling input from the set, or Q output terminal of flip-flop 204, and when thus enabled passes the clock pulses supplied to its second input to the input of counter 222 which thereupon commences the countdown operation.

The output of gate start decoder 224 is supplied as an input to the set terminals S of flip flops 234 and 236.

The output of gate center decoder 228 is supplied as an input to the reset terminal R of flip-flop 234 and the set terminal S of flip-flop 235. The output of the gate end decoder 226 is supplied as an input to the reset terminal R of flip-flop 235, the reset terminal R of flip-flop 236, and the set terminal S of flip-flop 237. The Q output of flip-flop 236, which is set for the interval from periods A to B, is conveniently employed as the gating signal. The flip-flop 234 is, therefore, set for the first half of the gate and thereafter reset at gate center, the flip-flop 235 is set at the gate center, and thereafter reset at gate end, the flip-flop 236 is set at gate start and reset at gate end, and thus is set for the full interval of the gate, and flip-flop 237 is set at gate end thereafter reset in a manner to be described.

The flip-flops 234 to 237 respectively provide enabling inputs to AND gates 244 through 247. AND gates 246 and 247 control the application of clock pulses to the phase counter 250, and particularly to the conventional or first stage input, and to the second stage input, respectively. The phase counter 250 may be controlled to count in either an up or down direction in response to output signals from the set and reset terminals Q and $\bar{Q}$, respectively of the flip-flop 235.

For a purpose to be described, phase counter 250 has prestored therein a count equal to ½ of the gate width prior to each new tracking assignment. When the phase counter 250 has counted down to zero, a zero output decoder 252 associated therewith produces an output pulse which is supplied to a first input of AND gate 254, the second input of which is connected to the set terminal Q of flip-flop 237. As discussed above, flip-flop 237 is set at the end of the gate by the output from gate end decoder 226 and thus maintains AND gate 254 enabled to pass an output signal from the zero decoder 252. The AND gate 254 output provides a reset signal to the flip-flop 237 and also a transfer signal to the transfer system 213.

The transfer function performed by transfer system 213 is substantially identical to that performed by the transfer system 114 in FIG. 4, and effectively is a jam transfer of the count from the counter 212 to the counter 222. As described in detail hereinafter, this transfer function is performed in relation to recognition of a phase error between the predicted and actual occurrence of a successive pulse of a train to effect a correction for such a phase error. Errors in the predicted interpulse period are also corrected in a manner substantially similar to that of the tracker of FIG. 4, through use of early and late counters 256 and 258, having respectively associated therewith full decoders 260 and 262, the outputs of which are supplied through OR gate 264 to the input of OR gate 210 associated with the counter 212. Control of counter 212 to count in either an up or down direction is effected by the set and reset outputs from terminals $\bar{Q}$ and Q respectively of flip-flop 234, as indicated.

The operation of the combined acquisition and tracker system of FIG. 7 may best be understood with reference to the timing charts and wave form diagrams of FIGS. 8A through 8I. As previously described, counter 212 is supplied with clock pulses for the inter-pulse interval between two successive signals, the first initiating the counting operation and the second, restricted to be recognized within the interval from period A to period B, terminating the counting operation. Upon receipt of the second pulse within the interval from period A to period B, clock pulses are supplied to the count down counter 222. As also previously described, counter 222 has prestored therein a count equal to ½ of the gate time plus ½ of the estimated pulse width. This count corresponds to the number of master clock pulses which would equal the equivalent time periods of ½ gate and ½ the estimated pulse width. As will become apparent, the estimate of the pulse width is made since the system tracking function is based on coincidence of the center of the pulse with the center of the gate.

In FIg. 8A the pulse p represents a first pulse received which initiated the counting operation of counter 212. The pulse p' represents a second pulse received within the permissible interval of inter-pulse periods from period A to period B. As above described, counter 212 terminated operation upon receipt of pulse p', at which time clock pulses were gated to AND gate 230 to counter 222. At the leading edge of pulse p', counter 222 initiated count down from the prestored value of ½ gate time plus ½ of the estimated pulse width. As a result ½ gate time after the estimated center of the pulse p', counter 2 has counted down to a zero count and gate end decoder 226 produces an output, setting flip-flop 237 and thereby enabling AND gate 247. AND gate 247 thereupon commences gating clock pulses from the output of AND gate 230 to the second stage input of phase counter 250.

Phase counter 250 has prestored therein a count of ½ the gate time, which prestorage is effected upon resetting of the phase counter 250 for every new tracking operation. Since phase counter 250 counts at a double rate in response to the clock pulses applied to the second stage thereof, it reaches a zero count in one quarter gate time. The zero decoder 252, therefore, supplies an output signal to AND gate 254. The output signal from zero decoder 252 occurs nominally three quarters of a gate time following the estimated center of the pulse p'. Since it may reasonably be assumed that the center of the pulse p' follows the gate start by at least one quarter gate time, the gate end decoder 226 will, in the interim, have supplied a set signal to flip-flop 237 which supplies the enabling input from its terminal Q to the AND gate 254. The output of zero decoder 252 thereby is gated through AND gate 254 to supply the reset signal to flip-flop 237 and a transfer signal to transfer system 213. The reset and transfer signals are, therefore, supplied three quarters of a gate time following the center of the pulse p'. The count accumulated by count 212 is thereupon transferred to counter 222.

As described above, counter 212 has prestored therein a maximum count less one quarter gate width and, therefore, must count through the count of one quarter gate width prior to accumulating a count which is the effective measure of the inter-pulse period. The count transferred to counter 222, therefore, is the measured inter-pulse period less one quarter gate width. The quarter gate width corresponds to the nominal one quarter gate time delay introduced by the phase counter 250 prior to generation of the transfer signal. This arrangement is analogous to that of the tracker FIG. 4 in which a count of one-half the gate width was prestored in counter 100. However, since tracker FIG. 7 performs center of pulse tracking whereas the tracker of FIG. 4 performs leading edge tracking, both relative to the gate center, the tracker of FIG. 7 operates on a prestored count related to one quarter gate width. The estimated inter-pulse period of the train acquired and tracked in the system of FIG. 7 is a combination of the count of counter 212 plus the nominal count of one quarter of the gate time. As a result if the estimated inter-pulse period is correct in both phase and period, and the received pulse was of the same width as estimated, the subsequently received pulse will be coincident at the center thereof with the occurrence of the center of the gate.

A refinement of the prestored count of the phase counter 250 is now pertinent to be discussed. A problem is presented in that the phase counter preferably should not count down to zero at or before gate end time. The system would be operable under these conditions, however. The zero decoder 252 would continue to enable AND gate 254, and upon setting of flip-flop 237 by the output from gate end decoder 226, the transfer and reset signal would be gated through by AND gate 254. This operation imposes stringent switching time requirements on the flip-flop 237, and reduces the time available for effecting the transfer function. In the preferred operation, the phase counter 250 is reset to a count including extra counts in addition to the gate width. In particular, since under some conditions, the phase counter counts down at a double rate, two extra counts in addition to the ½ gate time count are prestored in the phase counter 250. For a similar reason, counter 212 has prestored therein one count less than a count equal to the maximum count of the counter less the count corresponding to one quarter gate width, causing the count stored in counter 212 after period measurement to be one count less than the predicted period less ¼ gate time.

Reference will now be added to the waveform and timing cart diagrams of FIGS. 8B through 8I for a discussion of the various operations of the tracker under different tracking conditions. In all these figures, reference will be made to the period of the early gate and the late gate, defined respectively as the intervals between gate start and gate center, and between gate center and gate end.

Figure 8B:
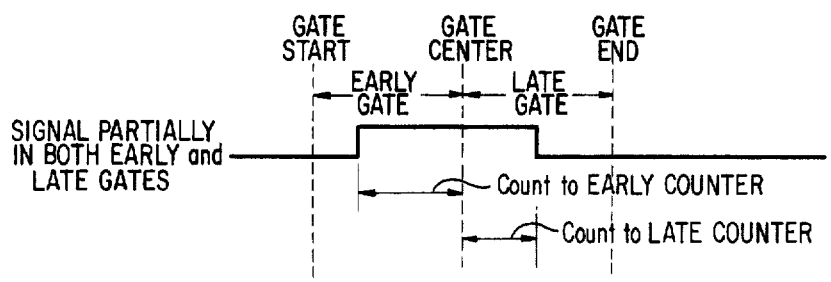
Figure 8C:
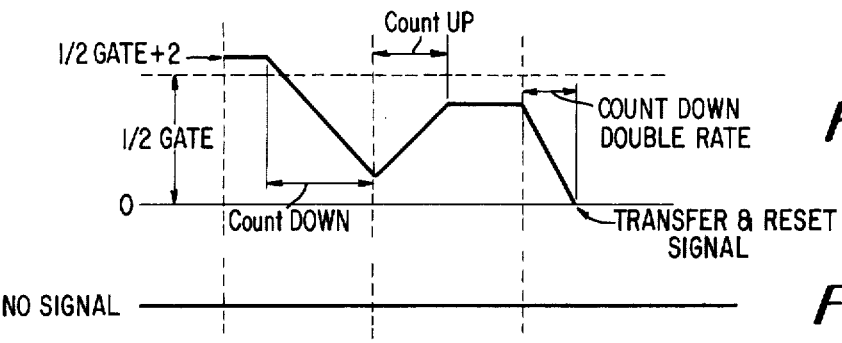

In FIG. 8C is shown a representation of the counting operation of phase counter 250 for producing a correction of the phase error in the prediction operation in tracking the pulse of FIG. 8B. As represented in FIG. 8B, the center of the pulse occurs in the early gate. Referring concurrently to FIGS. 7, 8B, and 8C, at the gate start, flip-flop 236 is set, and upon the occurrence of the signal and particularly the leading edge of that signal in FIG. 8B, AND gate 246 is enabled to gate clock pulses to the first stage input of phase counter 250. Flip-flop 235 is at this time in the reset condition and thus the $\overline{Q}$ output conditions phase counter 250 to count down. As shown in FIGS. 8C, the phase counter 250 counts down, at the master clock pulse rate until gate center, at which time flip-flop 235 is set and produces an output at the Q output terminal for conditioning the phase counter 250 to count up. At gate end, flip-flop 235 is reset simultaneously with reset of flip-flop 236, whereupon AND gate 246 is dissabled and flip-flop 237 is simultaneously set, enabling AND gate 247. Clock pulses are gated to the second stage of phase counter 250 which thereupon counts down to zero at a double rate. When the phase counter reaches zero, the zero count decoder 252 produces an output to the now enabled AND gate 254 for generating the transfer and reset signal. This transfer and reset signal occurs slightly prior to the time at which it would have occurred had the pulse been centered at the gate center, and thus the transfer is effected slightly earlier in time to effect the phase correction.

For example, had the pulse of FIG. 8B been exactly predicted, the phase counter 250 would have both counted down and up by exactly equal amounts and the double rate count down to zero would have occurred at the nominal time of one quarter gate plus one count.

Figure 8D:
Figure 8E:
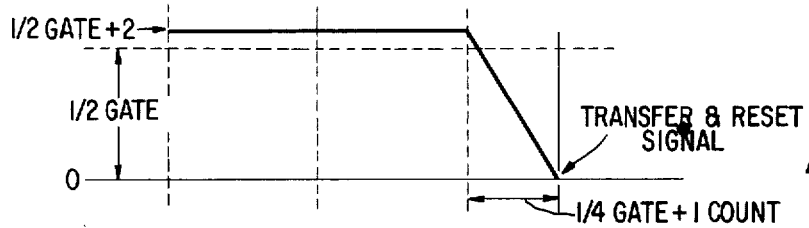

With reference to FIGS. 8D and 8E, if no signal occurs in the gate, AND gate 246 would not be enabled and the phase counter would not commence counting within the gate. However, in the manner previously described, at gate end time, the phase counter 250 would commence counting at a double rate and reach zero at the nominal time of one quarter gate count plus one count following gate end. At this time the transfer and reset signals would again be generated.

Figure 8F:
Figure 8G:
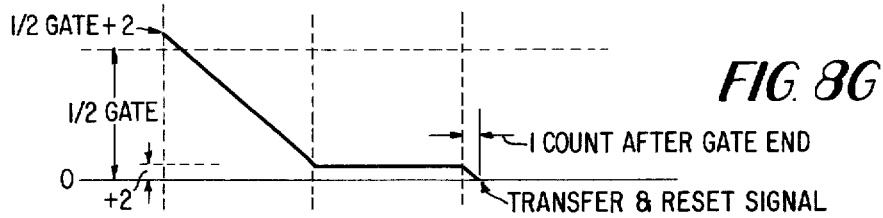

With reference to FIGS. 8F and 8G, there is represented the condition in which the entire signal occurs in the early gate. For convenience in describing certain operating characteristics, the signal is shown to be of ½ gate width, with the leading and trailing edges thereof coinciding with the gate start and gate center. In a manner hereinbefore described, the leading edge of the pulse initiates the application of master pulses to the phase counter 250 which immediately begins counting down from the prestored count of ½ gate plus two extra counts. At the gate center, the count operation is terminated with a remaining count of the two extra counts. At this point, the provision of the two extra counts will be appreciated. If they were not provided, the 0 decoder 252 would would provide an output signal in advance of the setting of flip-flop 237 by the output of gate AND decoder 226 associated with counter 222. A transfer signal would appear at the output of gate 254 following the clock pulse at gate end time by the delay caused by operating time of flip flop 237 which enables gate 254. This delay would reduce the time available to transfer the count from counter 212 to counter 224 before the next clock pulse occurs. At the gate end time, phase counter 250 receives clock pulses through the enabled AND gate 247 at the second stage input and counts down at a double rate, and thus in one master clock pulse time to zero. The transfer and reset signals are then generated one clock pulse time or one count, after gate end. Under this condition, therefore, the transfer and reset signals are generated one quarter of a gate pulse width in advance of the nominal count down time of the phase counter of one quarter of the gate width plus one count, to effect a phase correction of one quarter of the gate width. This phase correction corresponds to centering of the gate center with the center of the expected next received pulse.

Figure 8H:
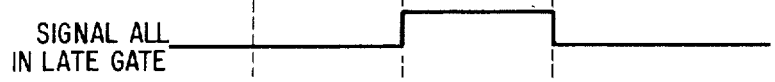
Figure 8I:
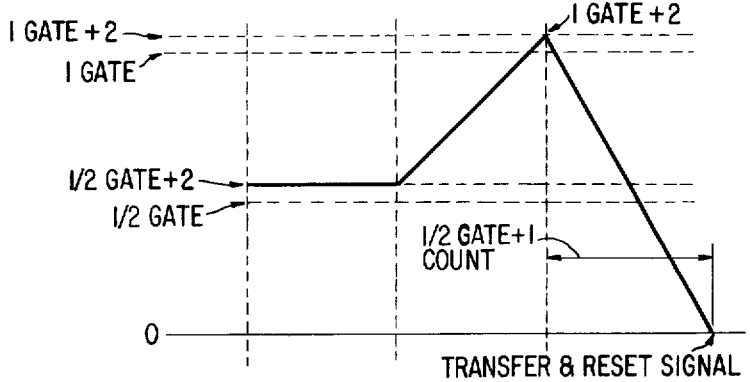

With reference to FIGS. 8H and 8I, there is illustrated the opposite extreme condition in which the entire signal falls within the late gate. Under this condition, the phase counter does not count at all during the early gate, but initiates count up at the gate center from the prestored count of ½ gate plus two counts. At gate end, a count of a full gate plus two counts has accumulated. The double rate count down is initiated at gate end, as hereinbefore described, and the phase counter 250 reaches a zero count at approximately ½ gate width plus one count time following the gate end. Under this condition, the transfer and reset signal is generated one quarter gate time following the nominal one quarter gate time plus one count after the gate end, to effect centering of the gate with the center of the next expected, successive pulse of the train being tracked.

The tracker of FIG. 7 effects a correction of the inter-pulse period prediction in a manner substantially identical to that of the system of FIG. 4. Thus, during the early gate, th flip flop 234 provides an enabling input to AND gate 244 which, when a signal is received, is enabled to gate clock pulses to the early counter 256. Flip-flop 234 is reset at gate center and simultaneously flip-flop 235 is set to enable AND gate 245. When a signal is received, AND gate 245 gates clock pulses to the late counter 258. Flip-flop 235 is reset at gate end. AND gates 244 and 245 are thus enabled for the duration of the signal within the early and late gates, respectively, to supply, or gate, master clock pulses to their respectively associated counters 256 and 258. The early and late counters 256 and 258 have respectively associated therewith full decoders 260 and 262 for supplying proportioned period correction pulses through OR gate 264 and OR gate 210 to counter 222. Flip-flop 234 provides the conditioning signals to control counter 212 to count either up or down during the late and early gate intervals, respectively.

The tracker of FIG. 7 further includes a disconnect system identical in operation to that of the tracker of 4. Thus, signals received during the gate are gated through AND gate 268 to a pulse in gate counter 160' and a number of gates counter 162' receives a pulse corresponding to each gate from gate start decoder 224 associated with counter 222. Counter 162' is reset by an output from the full decoder 164' associated with counter 160' and, if not reset thereby, alternatively provides a system reset output from its associated full decoder 166'. Each of the subsystems identified by prime numerals in this disconnect circuit are identical to the correspondingly numbered, but unprimed systems in the tracker of FIG. 4.

Various modifications of the system of the invention will readily be apparent to those skilled in the art. Particularly, it will be apparent that the acquisition circuit of FIG. 3 be employed with the tracker portion of the system of FIG. 7 to provide a three pulse acquisition requirement wherein tracking is effected on the center of pulse, center of gate tracking. Conversely, the two pulse acquisition circuit of the system of FIG. 7 may be employed with the tracker of FIG. 4 which establishes the tracking requirement of coincidence of the leading edge of the pulse with the center of the gate.

For example, with reference to FIG. 6A, the pulse there indicated may comprise either the tracking pulse from the three pulse acquisition circuit of FIG. 3 or the second pulse received in the gate in the two pulse acquisition circuit of FIG. 7. Conversely, with reference to FIG. 8A, the pulse $p'$ described to represent the second pulse received within the gate in the two pulse acquisition circuit, comprising a portion of the system of FIG. 7, may instead comprise the tracking pulse received from the three pulse acquisition circuit in the system of FIG. 3. In accordance with either of these alternative modifications, the appropriate gating of clock pulses to the up-down counters and the count down counters of the pulse leading edge tracking circuit of FIG. 4 or the center of pulse tracking circuit of FIG. 7 would be appropriately provided to establish the requisite tracking operations as described hereinabove.

In summary, the acquisition and tracking systems of the invention are completely digital in operation, in performing the functions of initial measurement of inter-pulse intervals for pulse trains having a preselected range of inter-pulse periods to initiate tracking operations, of measurement of errors in prediction of such initially measured inter-pulse periods or errors resulting in drift in frequency of the pulse train being tracked or drift of the master clock as to both phase and period errors, and of correcting these predicted inter-pulse periods. All systems operate at rates defined by the pulse repetition rate of the master clock source, which may be selected to be of a highly stable repetition rate. Since all systems operate at the master clock rate or at some rate quantized thereto or a submultiple thereof, the entire system is highly stable and synchronized in operation. In addition to great stability in operation, the system affords rapid lock-on to the inter-pulse period of a pulse train in the initial acquisition thereof and rapid correction of predicted inter-pulse intervals for the subsequent tracking operations.

We claim as our invention:

1. A pulse train tracking system for selectively tracking pulse trains derived from a signal input of composite pulse trains wherein successive pulses of a given train are separated by substantially equal inter-pulse periods, comprising:

first means responsive to a master clock pulse train for digitally measuring the inter-pulse period between a given pulse of said signal input and a successive pulse thereof received within an interval of predetermined minimum and maximum inter-pulse periods after said given pulse, a plurality of second means responsive to said input signal for selectively and independently different respective trains of pulses, and each of said second means being responsive to the inter-pulse period measurement of said first means for establishing a prediction of the inter-pulse period in accordance with the master clock pulse rate and a gate defined by a predetermined number of master clock pulses within which is predicted the occurrence of the next successive pulse of a train including the given and successive pulses for tracking of that train, said first means being operative to effect said digital measurement for each of a plurality of sets of said given and successive pulses in said input signal, in sequence, and available ones of said second means are selectively rendered responsive to said measurements by said first means for independently tracking of the corresponding trains of pulses, third means responsive to an error between the predicted and actual occurrences of each of successive pulses of that train received within corresponding, successive ones of said gates, said third means controlling said second means to effect a corresponding correction in the prediction by said second means of the occurrence of the respectively next successive pulses, said third means including quantizing means responsive to said digital error measurements to produce a digital correction signal in response to receipt and accumulation of a predetermined number of master clock pulses corresponding to said measurements, said first means also including means to compare inter-pulse periods and establish a prediction of the inter-pulse period of a pulse train to be tracked, said third means also effecting measurement, at the master clock pulse rate, the magnitude of said errors between said predicted and actual occurrences of said successive pulses of said train of pulses and producing a digital correction signal in response to said digital error measurements, said first means also being responsive to the digital correction signal of said third means for effecting a correction of the prediction of the inter-pulse period of the train of pulses being tracked and said first means being responsive to receipt of a first pulse from said input preceding said given pulse by an inter-pulse period substantially equal to the inter-pulse period measured between said given and successive pulses for effecting said digital measurement.

2. A pulse train tracking system as recited in claim 1 wherein each of said second means is operable to disable said first means from effecting such digital measurement with respect to pulses in said signal input of a train currently being tracked by one of said second means.

3. A pulse train tracking system as recited in claim 2 wherein there is further provided assignment means responsive to the tracking operations of each of said second means for identifying available and busy ones of said second means and for selectively assigning available ones of said second means for responding to said digital measurements of said first means for sequential assignment thereof for tracking of trains.

4. A pulse train tracking system as recited in claim 1 wherein said first means comprises a first digital counter responsive to a pulse train from a master clock pulse source and to receipt of a given pulse of said signal input to accumulate a count at a rate in accordance with said master clock pulse train until receipt of the successive pulse for effecting said digital measurement of the inter-pulse period therebetween.

5. A pulse train tracking system as recited in claim 4 wherein:

said second means includes a count down digital counter responsive to the count accumulation of said first means in a jam transfer of said count accumulation of said first means to said second means following receipt of said successive pulse and responsive to said master clock pulse rate to count down from said transferred accumulated count, said second means including decoder means associated with said counter and responsive to the countdown operation thereof to establish said gate as a predetermined number of counts preceding a count of zero.

6. A pulse train tracking system as recited in claim 5 wherein:

said third means includes a digital phase counter having prestored therein a predetermined count selected in accordance with the number of master clock pulses corresponding to said gate and responsive to a clock pulse rate to count down from said prestored count to zero, and said third means controls said phase counter thereof in the absence of a pulse within one of said gates to count down to zero at a rate in accordance with a nominal time period following the gate end to effect said jam transfer at the count of zero and in response to receipt of a pulse within said gate to initiate count down of said counter simultaneously therewith and to effect count down to zero at a time related to said nominal time by an amount corresponding to the error between the predicted and actual occurrences of the pulse within the gate to effect said jam transfer at a time to correct for said error in the prediction of the occurrence of each next successive pulse.

7. A pulse train tracking system as recited in claim 6 wherein:

said third means further includes first and second quantizing means and corresponding first and second gating means, said gating means being responsive to the occurrence of a signal pulse within said gate and to the count down operation of said phase counter of said third means for gating clock pulses to said first quantizing means for a time interval equal to the time interval by which the actual occurrence of a pulse precedes the predicted occurrence thereof, and to said late quantizing means for a time interval by which the actual occurrence of a pulse follows the predicted occurrence thereof, and said digital counter of said first means is conditioned by said first and second gating means of said third means to count alternatively in up and down directions, respectively, and responds to the outputs of said first and second quantizing means of said third means to count in the conditioned directions by the quantized count outputs of said first and second quantizing means.

8. A pulse train tracking system as recited in claim 1 wherein said first means further comprises:

a digital counter responsive to a train of master clock pulses from a master clock pulse source and to receipt of a pulse from said signal input to initiate counting in response to the master clock pulses, said counter including first decoder means establishing a first interval of predetermined minimum and maximum inter-pulse periods subsequent to initiation of counting, and second decoder means establishing a second interval of predetermined minimum and maximum inter-pulse periods subsequent to said first interval, in accordance with accumulation of predetermined numbers of counts corresponding to said periods, storage means controlled by said first decoder of said counter to be enabled during said first interval for individually identifiable storage of pulses from said signal input occurring during said first interval, said storage being effected at a first clock pulse rate synchronized to the master clock pulse rate, and said storage means being responsive to said second decoder for read out of the pulse storage therein during said second interval at a second clock pulse rate of one-half of said first clock pulse rate and synchronized to the master clock pulse rate, and comparison means responsive to said storage means and to signal pulses from said signal input received during said second interval for comparison of the said signal pulses received from said signal input during said second interval with the storage pulses read out from said storage means during said second interval, said comparison means producing an output signal for establishing tracking of a train including said first, said given, and said successive pulses when a successive pulse received from said signal input is coincident with a storage pulse read out from said storage means during said second interval and thus when the inter-pulse period of said given pulse and said successive pulse is equal to the inter-pulse period of said given pulse and said first pulse which initiated counting by said counter.

9. In a pulse train tracking system having acquisition means which identify and acquire pulse trains, in succession, from a signal input of composite pulse trains and having a plurality of tracking means individually assigned for selectively tracking pulse trains acquired by said acquisition means from the signal input, to which said tracking means are individually and selectively assigned for tracking thereof, wherein in each such pulse successive pulses are separated by substantially equal inter-pulse periods, and wherein the inter-pulse periods of successive pulses is predicted and the occurrence of each successive pulse is predicted within a gate with the leading edge of the pulse at the gate center, the improvement comprising:

a first digital counter responsive to a source of master clock pulses and a pulse received from said signal input to initiate counting in response to master clock pulses, said first counter including first and second decoders establishing a first interval of predetermined minimum and maximum inter-pulse periods relative to the initiation of counting by said first counter and third and fourth decoders establishing a second interval of predetermined minimum and maximum inter-pulse periods relative to said first interval, in accordance with predetermined counts corresponding to each of said periods, storage means controlled by said first decoder of said counter to be enabled during said first interval for individually identifiable storage of pulses from said signal input occurring during said first interval, said storage being effected at a first clock pulse rate synchronized to the master clock pulse rate and said storage means being responsive to said second decoder for read out of the pulse storage therein during said second interval at a second clock pulse rate of one half said first clock pulse rate and synchronized to the master clock pulse rate, comparison means responsive to said storage means and to said signal input for comparing pulses received from said signal input during said second interval with the storage pulses read out from said storage means during said second interval to generate a tracking signal upon coincidence of said compared pulses, representing receipt of three successive pulses having equal inter-pulse intervals, for initiating tracking of the pulse train including the said pulses, and said acquisition means providing a controlled digital measurement of the inter-pulse period of the said pulses in relation to said master clock pulse rate in accordance with said count of said predetermined minimum inter-pulse period of said first interval and the occurrence of the tracking signal relative to the minimum inter-pulse period of said second interval.

10. In a pulse train tracking system as recited in claim 9, the improvement further comprising:

a storage counter and a count down counter in each of said tracking means, said storage counter being controlled by said acquisition means and in response to said source of master clock pulses to accumulate a count in accordance with the inter-pulse period measurement control of said acquisition means, said count down counter receiving in a jam transfer, a controlled time period subsequent to receipt of each pulse of a train being tracked, the count accumulated by said storage counter to establish a prediction of the inter-pulse period of the train being tracked thereby, said count down counter further including gate start and gate end decoders defining a gate as a number of master clock pulse counts between a predetermined count and zero count of said count down counter within which is predicted the occurrence of the next successive pulse of a train being tracked by said tracking means with the leading edge thereof at gate center, and transfer control means, responsive to the occurrence of said gate to effect said jam transfer a nominal time period after the gate end, said transfer control means including error correction means responsive to the occurrence of a pulse within said gate to effect said jam transfer at a time prior to or following said nominal time period by an amount equal to the amount by which the actual occurrence of the leading edge of the pulse received within said gate precedes or follows, respectively, the predicted occurrence thereof at gate center.

11. In a pulse train tracking system as recited in claim 10, the improvement further comprising:

gating means responsive to said third decoder of said first digital counter for initiating counting of said storage counter of said tracking means simultaneously with enabling of said third decoder at a rate equal to one-half of said master clock pulse rate, said storage counter has prestored therein prior to each tracking operation a count equal to the count of the minimum inter-pulse period of said first digital counter less a count of one-half of the count of said gate, and said transfer control means is operative to effect said jam transfer a nominal time period equal to one-half of the gate count at the master clock pulse rate following the gate end whereby the next successive pulse following initiation of tracking is predicted to occur with the leading edge thereof in coincidence with the gate center.

12. In a pulse train tracking system as recited in claim 11 wherein said transfer control means further comprises:

a phase counter having prestored therein a count equal to the count of said gate, gate means for selectively gating clock pulses to said phase counter for effecting count down selectively at the master clock pulse rate and at twice the master clock pulse rate, said phase counter includes a zero count decoder responsive to count down of said phase counter to a count of zero for producing a transfer signal effecting said jam transfer, and said gate means is responsive to the output of said gate end decoder in the absence of a pulse predicted to occur within a gate for initiating at gate end, count down of said phase counter at twice the master clock pulse rate to effect said jam transfer at said nominal time period following gate end and being responsive to the occurrence of a pulse within said gate for initiating substantially simultaneously with the leading edge thereof, count down of said phase counter at the master clock pulse rate for effecting said jam transfer one gate period following the actual occurrence of the leading edge of said pulse within said gate.

13. In a pulse train tracking system as recited in claim 12, the improvement further comprising:

early and late gating means and early and late counters respectively associated therewith, said phase counter includes a ½ gate count decoder defining a first half of the gate as an early gate and the last half of the gate as a late gate, said early gating means is responsive to an output from said ½ gate count decoder of said phase counter and to an output from the gate and decoder of said count down counter to establish an interval in which master clock pulses are gated to said early counter in response to the actual occurrence of a pulse in the early gate as a digital measurement of the error between the actual occurrence of the leading edge of that pulse and the predicted occurrence thereof at gate center, said late gating means being responsive to an output from the gate end decoder of said count down counter and the zero count decoder of said phase counter to establish an interval in which master clock pulses are gated to said late counter in response to the actual occurrence of a pulse in the late gate as a digital measurement of the error between the predicted occurrence of the leading edge of that pulse at the gate center and the actual occurrence thereof, said early and late counters each including full count decoders providing an error correction pulse to said storage counter, and said storage counter being conditioned by said gating means to count in up or down directions by an amount in accordance with correction signals from said full decoders of said early and late counters, respectively, to correct errors in the predicted inter-pulse period.

14. In a pulse train tracking system having acquisition means which identify and acquire pulse trains from a signal input of composite pulse trains and having tracking means for selectively tracking a pulse train acquired by said acquisition means from the signal input, wherein in each such pulse train successive pulses are separated by substantially equal inter-pulse periods and wherein the inter-pulse period of successive pulses is predicted and the occurrence of each successive pulse is predicted within a gate with the center of the pulse at the gate center, the improvement comprising:

a first digital counter responsive to a source of master clock pulses and a first pulse received from said signal input to initiate counting in response to master clock pulses, said first counter including first and second decoders establishing an interval of predetermined minimum and maximum inter-pulse periods relative to the initiation of counting by said first counter in accordance with predetermined counts corresponding to each of said periods, said first counter accumulating a count at the master clock pulse rate from receipt of said first pulse to receipt of a pulse within said interval, a count down counter receiving in a jam transfer, a controlled time period subsequent to receipt of said pulse within said interval, the count accumulated by said first counter to establish a prediction of the inter-pulse period of the train being tracked thereby, said count down counter further including gate start, gate center, and gate end decoders, said gate start and gate end decoders defining a gate as a number of master clock pulse counts between a predetermined count and zero count of said count down counter and said gate center decoder defining the center of said gate at which is predicted the occurrence of the center of the next successive pulse of a train being tracked by said tracking means, and transfer control means, responsive to the occurrence of said gate to effect said jam transfer a nominal time period after the gate end, said transfer control means being responsive to the occurrence of a pulse within said gate to effect said jam transfer at a time prior to or following said nominal time period by an amount equal to the amount by which the actual occurrence of the center of the pulse received within said gate receives or follows, respectively, the predicted occurrence thereof at gate center.

15. In a pulse train tracking system as recited in claim 14, wherein:

said storage counter is reset following each tracking operation to a prestored count corresponding to one-half of the gate count plus one-half of the estimated pulse width in accordance with the master clock pulse rate, and is operative to initiate counting at said master clock pulse rate upon receipt of said first pulse, through said prestored count, prior to accumulating a count until receipt of a subsequent pulse within said interval, and said transfer control means is operative to effect said jam transfer at a nominal time period equal to one quarter of the gate count at the master clock pulse rate following the gate end, whereby the next successive pulse following initiation of the tracking is predicted to occur with the center thereof in coincidence with the gate center.

16. A pulse train tracking system as recited in claim 15, the improvement further comprising:

early gating means responsive to the output of said gate start decoder and said gate center decoder for gating master clock pulses to said early counter for the duration of a pulse occurrence within said early gate and said late gating means responsive to the output of said gate center decoder and gate end decoder for gating master clock pulses to said late counter for the duration of a pulse occurrence within said late gate, said early and late counters each include full count decoders providing error correction pulses to said first counter, and said first counter is controlled by said early and late gating means for counting in up or down directions, respectively, in response to error correction signals from said full decoders of said early and late counters, respectively, to correct errors in the predicted inter-pulse period.

17. In a pulse train tracking system as recited in claim 16 wherein said transfer control means further comprises:

a phase counter having prestored therein a count substantially equal to one-half the count of said gate, gate means for selectively gating clock pulses to said phase counter for effecting counting thereby selectively at the master clock pulse rate and at twice the master clock pulse rate, said phase counter includes a zero count decoder responsive to count down of said phase counter to a count of zero for producing a transfer signal for effecting said jam transfer, and said gate means is responsive to the outputs of said gate start and gate center decoders to effect count down of said phase counter at the master clock pulse rate for the duration of a pulse occurrence within said early gate, to the outputs of said gate center and gate end decoders to effect count up of said phase counter at the master clock pulse rate for the duration of a pulse occurrence within said late gate and to the output of said gate end decoder to count down at twice the master clock pulse rate to a count of zero, a nominal time period after gate end, whereby said transfer signal is produced prior to or following said nominal time period by an amount equal to that by which the actual occurrence of the center of the pulse is prior to or later than the predicted occurrence thereof at gate center.

* * * * *